(12) United States Patent
Morinaga

(10) Patent No.: US 11,156,888 B2
(45) Date of Patent: Oct. 26, 2021

(54) ACTIVE MATRIX SUBSTRATE, IN-CELL TOUCH PANEL LIQUID CRYSTAL DISPLAY DEVICE PROVIDED WITH ACTIVE MATRIX SUBSTRATE, AND MANUFACTURING METHOD OF ACTIVE MATRIX SUBSTRATE

(71) Applicant: SHARP KABUSHIKI KAISHA, Sakai (JP)

(72) Inventor: Junichi Morinaga, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/133,051

(22) Filed: Dec. 23, 2020

(65) Prior Publication Data

US 2021/0200045 A1 Jul. 1, 2021

(30) Foreign Application Priority Data

Dec. 26, 2019 (JP) ................................. 2019-235845

(51) Int. Cl.
*G02F 1/1368* (2006.01)
*G02F 1/1362* (2006.01)
(Continued)

(52) U.S. Cl.
CPC ...... *G02F 1/136286* (2013.01); *G02F 1/1351* (2021.01); *G02F 1/1368* (2013.01); *G02F 1/136227* (2013.01); *G09G 3/3677* (2013.01); *G02F 2201/123* (2013.01); *G02F 2202/10* (2013.01)

(58) Field of Classification Search
CPC ............ G02F 1/136286; G02F 1/1351; G02F 1/136227; G02F 1/1368; G02F 2201/123; G02F 2202/10; G09G 3/3677
See application file for complete search history.

(56) References Cited

U.S. PATENT DOCUMENTS

2008/0035920 A1 2/2008 Takechi et al.
2010/0320471 A1 12/2010 Takechi et al.
(Continued)

FOREIGN PATENT DOCUMENTS

JP 2008040343 A 2/2008
JP 2012134475 A 7/2012
(Continued)

*Primary Examiner* — Hoan C Nguyen
(74) *Attorney, Agent, or Firm* — ScienBiziP, P.C.

(57) ABSTRACT

An active matrix substrate includes a plurality of gate wiring lines extending in a row direction and a plurality of source wiring lines extending in the column direction and a plurality of touch wiring lines extending in the column direction, wherein a pair of gate wiring lines are connected to one pixel row and one source wiring line is connected to a pair of pixel columns, the pair of pixel columns includes a first pixel column and a second pixel column adjacent to the first pixel column, and when viewed from a normal direction of a main surface of the substrate, each source wiring line is disposed between the first pixel column and the second pixel column in the corresponding pair of pixel columns, and each touch wiring line is disposed between two adjacent pixel columns between two adjacent source wiring lines.

18 Claims, 29 Drawing Sheets

(51) Int. Cl.
*G02F 1/135* (2006.01)
*G09G 3/36* (2006.01)

(56) References Cited

U.S. PATENT DOCUMENTS

| | | | |
|---|---|---|---|
| 2012/0127414 A1* | 5/2012 | Shin | G09G 3/3648 349/139 |
| 2012/0138922 A1 | 6/2012 | Yamazaki et al. | |
| 2012/0249454 A1* | 10/2012 | Teraguchi | G06F 3/0445 345/173 |
| 2013/0214273 A1 | 8/2013 | Yamazaki et al. | |
| 2013/0320334 A1 | 12/2013 | Yamazaki et al. | |
| 2014/0183532 A1 | 7/2014 | Yamazaki et al. | |
| 2014/0286076 A1 | 9/2014 | Aoki et al. | |
| 2015/0179805 A1 | 6/2015 | Yamazaki et al. | |
| 2016/0181344 A1* | 6/2016 | Seo | H01L 27/3272 257/40 |
| 2016/0187690 A1 | 6/2016 | Nam et al. | |
| 2016/0240694 A1 | 8/2016 | Yamazaki et al. | |
| 2017/0033229 A1 | 2/2017 | Yamazaki et al. | |
| 2017/0309751 A1 | 10/2017 | Yamazaki et al. | |
| 2017/0309754 A1 | 10/2017 | Yamazaki et al. | |
| 2018/0004322 A1 | 1/2018 | Nakanishi | |
| 2018/0120995 A1* | 5/2018 | Lee | H01L 27/323 |
| 2018/0308989 A1 | 10/2018 | Yamazaki et al. | |
| 2019/0187837 A1 | 6/2019 | Nakanishi | |
| 2019/0339557 A1 | 11/2019 | Tominaga et al. | |
| 2020/0185425 A1 | 6/2020 | Hara et al. | |

FOREIGN PATENT DOCUMENTS

| | | |
|---|---|---|
| JP | 2014007399 A | 1/2014 |
| JP | 2014209727 A | 11/2014 |
| JP | 2016126336 A | 7/2016 |
| JP | 2018005484 A | 1/2018 |
| WO | 2017/126603 A1 | 7/2017 |
| WO | 2018/092758 A1 | 5/2018 |
| WO | 2018/168682 A1 | 9/2018 |
| WO | 2018/212100 A1 | 11/2018 |

* cited by examiner

| STEP 1<br>FORM LIGHT<br>BLOCKING LAYER | DEPOSIT LIGHT BLOCKING FILM |
|---|---|
| | PHOTOLITHOGRAPHY PROCESS (RESIST PATTERNING) |
| | ETCHING LIGHT BLOCKING FILM |
| | PEEL RESIST |

| STEP 2<br>FORM LOWER INSULATING<br>LAYER AND OXIDE<br>SEMICONDUCTOR FILM | DEPOSIT FIRST INSULATING FILM |
|---|---|
| | DEPOSIT OXIDE SEMICONDUCTOR FILM |
| | PHOTOLITHOGRAPHY PROCESS (RESIST PATTERNING) |
| | ETCH OXIDE SEMICONDUCTOR FILM |
| | PEEL RESIST |

| STEP 3<br>FORM GATE INSULATING<br>LAYER, GATE ELECTRODE,<br>AND GATE WIRING LINE | DEPOSIT SECOND INSULATING FILM |
|---|---|
| | DEPOSIT GATE METAL FILM |
| | PHOTOLITHOGRAPHY PROCESS (RESIST PATTERNING) |
| | ETCH GATE METAL FILM |
| | ETCH SECOND INSULATING FILM |
| | PEEL RESIST |

| STEP 4<br>LOWER RESISTANCE OF<br>OXIDE SEMICONDUCTOR FILM | PERFORM PLASMA TREATMENT ON OXIDE<br>SEMICONDUCTOR FILM |
|---|---|

| STEP 5<br>FORM FIRST INTERLAYER<br>INSULATING LAYER AND<br>CONTACT HOLE | DEPOSIT FIRST INTERLAYER INSULATING LAYER (THIRD INSULATING FILM) |
|---|---|
| | PHOTOLITHOGRAPHY PROCESS (RESIST PATTERNING) |
| | ETCH FIRST INTERLAYER INSULATING LAYER |
| | PEEL RESIST |

| STEP 6<br>FORM SOURCE ELECTRODE,<br>DRAIN ELECTRODE,<br>AND SOURCE WIRING LINE | DEPOSIT SOURCE METAL FILM |
|---|---|
| | PHOTOLITHOGRAPHY PROCESS (RESIST PATTERNING) |
| | ETCH SOURCE METAL FILM |
| | PEEL RESIST |

| STEP 7<br>FORM SECOND INTERLAYER<br>INSULATING LAYER,<br>ORGANIC INSULATING LAYER,<br>AND CONTACT HOLE | DEPOSIT SECOND INTERLAYER INSULATING LAYER (FOURTH INSULATING FILM) |
|---|---|
| | DEPOSIT ORGANIC INSULATING LAYER (FIFTH INSULATING FILM) |
| | PATTERN ORGANIC INSULATING LAYER |
| | ASH ORGANIC INSULATING LAYER |
| | ETCH SECOND INTERLAYER INSULATING LAYER |
| | ETCH LOWER INSULATING LAYER |
| | PEEL RESIST |

| STEP 8<br>FORM PIXEL<br>ELECTRODE | DEPOSIT FIRST TRANSPARENT CONDUCTIVE FILM |
|---|---|
| | PHOTOLITHOGRAPHY PROCESS (RESIST PATTERNING) |
| | ETCH FIRST TRANSPARENT CONDUCTIVE FILM |
| | PEEL RESIST |

| STEP 9<br>FORM TOUCH<br>WIRING LINE | DEPOSIT METAL FILM FOR TOUCH WIRING LINE |
|---|---|
| | PHOTOLITHOGRAPHY PROCESS (RESIST PATTERNING) |
| | ETCH METAL FILM FOR TOUCH WIRING LINE |
| | PEEL RESIST |

| STEP 10<br>FORM THIRD INTERLAYER<br>INSULATING LAYER | DEPOSIT THIRD INTERLAYER INSULATING LAYER (SIXTH INSULATING FILM) |
|---|---|
| | PHOTOLITHOGRAPHY PROCESS (RESIST PATTERNING) |
| | ETCH THIRD INTERLAYER INSULATING LAYER |
| | PEEL RESIST |

| STEP 11<br>FORM COMMON ELECTRODE<br>(TOUCH SENSOR ELECTRODE) | DEPOSIT SECOND TRANSPARENT CONDUCTIVE FILM |
|---|---|
| | PHOTOLITHOGRAPHY PROCESS (RESIST PATTERNING) |
| | ETCH SECOND TRANSPARENT CONDUCTIVE FILM |
| | PEEL RESIST |

FIG. 9

ACTIVE MATRIX SUBSTRATE, IN-CELL TOUCH PANEL LIQUID CRYSTAL DISPLAY DEVICE PROVIDED WITH ACTIVE MATRIX SUBSTRATE, AND MANUFACTURING METHOD OF ACTIVE MATRIX SUBSTRATE

CROSS-REFERENCE TO RELATED APPLICATIONS

This application claims the benefit of priority to Japanese Patent Application Number 2019-235845 filed on Dec. 26, 2019. The entire contents of the above-identified application are hereby incorporated by reference.

BACKGROUND

Technical Field

The present disclosure relates to an active matrix substrate, an in-cell touch panel liquid crystal display device provided with an active matrix substrate, and a manufacturing method of an active matrix substrate.

Currently, a liquid crystal display device that is widely used includes an active matrix substrate provided with switching elements on a pixel-by-pixel basis. An active matrix substrate provided with thin film transistors (hereinafter referred to as a "TFT") as the switching elements is referred to as a TFT substrate. Note that a region of the active matrix substrate corresponding to pixels of the liquid crystal display device may also be referred to herein as pixels. The TFT provided as a switching element to each pixel of the active matrix substrate may be referred to as a "pixel TFT".

In recent years, use of an oxide semiconductor as a material of an active layer of the TFT, in place of amorphous silicon and polycrystalline silicon has been proposed. A TFT having an oxide semiconductor film as an active layer is referred to as an "oxide semiconductor TFT". JP 2012-134475 A discloses an active matrix substrate in which an In—Ga—Zn—O-based semiconductor film is used in an active layer of a TFT.

The oxide semiconductor has mobility higher than that of amorphous silicon. Thus, the oxide semiconductor TFT can operate at a higher speed than an amorphous silicon TFT. In addition, since an oxide semiconductor film is formed by a process simpler than that of a polycrystalline silicon film, the oxide semiconductor film can be applied to a device that requires a large area.

A structure of the TFT is roughly classified into a bottom gate structure and a top gate structure. Now, although many oxide semiconductor TFTs have the bottom gate structure, an oxide semiconductor TFT having the top gate structure is also proposed. In the top gate structure, the gate insulating layer can be thinned, resulting in high current supply performance.

In the liquid crystal display device, a gate driver or a source shared driving (SSD) circuit may be integrally (monolithically) formed on the active matrix substrate for the purpose of frame narrowing of the liquid crystal panel and reducing the number of mounted driver ICs. The gate driver monolithically formed on the active matrix substrate may be referred to as a GDM circuit. In the active matrix substrate on which the GDM circuit and the SSD circuit are monolithically formed, the TFT needs to charge a large capacitance (bus line capacitance), so the TFT preferably has the top gate structure. The top gate structure is preferable also from the perspective of allowing space saving for frame narrowing.

In the TFT having the top gate structure, a configuration is known in which a light blocking layer is provided below a channel region of the semiconductor layer in order to prevent an occurrence of leakage current due to irradiation of a light to the semiconductor layer. WO 2018/212100 A discloses a configuration in which such a light blocking layer is provided.

In the recent past, a fringe field switching (FFS) mode has often been adopted as a display mode for a small- and medium-sized liquid crystal display device used in a tablet, a laptop PC, and a smartphone.

In the FFS mode liquid crystal display device, a pair of electrodes for generating a fringe electrical field is provided on one of a pair of substrates that sandwich a horizontally-aligned liquid crystal layer. The pair of electrodes is configured, for example, by a pixel electrode with a plurality of slits formed therein, and a common electrode disposed below the pixel electrode with an insulating layer interposed therebetween. Alternatively, the pair of electrodes is configured by a common electrode with a plurality of slits formed therein, and a pixel electrode disposed below the common electrode with an insulating layer interposed therebetween. When a voltage is applied between the pixel electrode and the common electrode, the fringe electrical field is generated and an alignment regulating force of the fringe electrical field changes an alignment direction of liquid crystal molecules.

In this way, in the FFS mode liquid crystal display device, an alignment state of the liquid crystal molecules is controlled using the fringe electrical field. In the FFS mode, since the liquid crystal molecules rotate in a plane parallel to a display surface, high viewing angle characteristics are obtained.

The liquid crystal display device used in a smartphone, a tablet, or the like has a touch sensor function. Various types of touch sensors are known, such as a resistive film type, an electrostatic capacitive type, and an optical type. The electrostatic capacitive touch sensor electrically detects a change in an electrostatic capacitance due to contact or approximation of an object (for example, a finger) to determine whether the display device is in a touched state.

The electrostatic capacitive touch sensor includes a self-capacitive type that detects a change in an electrostatic capacitance generated between an electrode for the touch sensor and the object (for example, the finger), and a mutual capacitive type that generates an electrical field using a pair of electrodes (a transmitter electrode and a receiver electrode) for the touch sensor to detect a change in the electrical field between the electrodes.

The liquid crystal display device provided with the touch sensor (hereinafter, referred to as a "touch panel") includes an external type (in which a touch sensor is disposed closer to a viewer side than a polarizer disposed on the viewer side), and a built-in type. The built-in touch panel is more advantageous for thickness and weight reduction, and the like than the external touch panel, and has the advantage of increasing a transmittance of light.

The built-in touch panel includes an on-cell touch panel and an in-cell touch panel. Here, a cell refers to a display cell (hereinafter, referred to as a "display panel"), and, for example, a liquid crystal display panel includes an active matrix substrate (TFT substrate) and a counter substrate which are disposed to face each other with a liquid crystal layer interposed therebetween, and does not include a polarizer. The "in-cell type" refers to those having a layer that serves as a touch sensor function in the display panel. On the other hand, the "on-cell type" refers to those having a layer that serves as a touch sensor function and is disposed between the display panel and the polarizer (for example, between the counter substrate and the polarizer).

WO 2018/168682 A by the Applicant discloses an in-cell touch panel that displays in an FFS mode. Hereinafter, an in-cell touch panel using a liquid crystal display panel is referred to as an "in-cell touch panel liquid crystal display device" or simply an "in-cell touch panel".

The in-cell touch panel in WO 2018/168682 A uses a TFT having the bottom gate structure as the pixel TFT. The common electrode is separated into a plurality of segments, and each segment also functions as an electrode for a touch sensor (hereinafter, a "touch sensor electrode"). Each touch sensor electrode is connected with a wiring line for driving and/or detecting the touch sensor (hereinafter, collectively referred to as "touch wiring line").

SUMMARY

The in-cell touch panel that displays in the FFS mode has a problem that in a case where an oxide semiconductor TFT having the top gate structure is used as the pixel TFT, manufacturing processes of the active matrix substrate are increased to increase manufacturing costs.

This comes from that the FFS mode needs two layers of transparent electrodes (the pixel electrode and the common electrode) which are disposed one above the other with the insulating layer interposed therebetween, and the oxide semiconductor TFT having the top gate structure needs a multilayer structure of a light blocking layer, an oxide semiconductor layer, a gate wiring line, a source wiring line, and the like.

The touch wiring line is further provided on the active matrix substrate to give the touch sensor function. An interlayer insulating layer for insulating the touch wiring line from other wiring line layers may be added, if needed. This causes the number of manufacturing processes to further increase.

Note that the in-cell touch panel disclosed in WO 2018/168682 A uses a TFT having the bottom gate structure as the pixel TFT, and does not disclose a specific structure or manufacturing processes of the active matrix substrate using the TFT having the top gate structure.

The present disclosure has been made in view of the problems described above, and has an object to reduce manufacturing processes of an active matrix substrate including an oxide semiconductor TFT having a top gate structure as a pixel TFT and manufacturing processes of an in-cell touch panel having such an active matrix substrate to reduce manufacturing costs.

Disclosed herein in the following items are an active matrix substrate, an in-cell touch panel liquid crystal display device provided with an active matrix substrate, and a manufacturing method of an active matrix substrate.

Item 1

An active matrix substrate including a plurality of pixel areas arranged in a matrix in a row direction and a column direction, the plurality of pixel areas including a plurality of pixel rows and a plurality of pixel columns, the active matrix substrate including:

a substrate having a main surface;
a plurality of light blocking layers provided on the main surface of the substrate;
a lower insulating layer provided to cover the plurality of light blocking layers;
pixel TFTs, each pixel TFT being provided corresponding to each of the plurality of pixel areas, the pixel TFT including an oxide semiconductor layer provided on the lower insulating layer, a gate insulating layer provided on the oxide semiconductor layer, and a gate electrode provided to face the oxide semiconductor layer with the gate insulating layer interposed between
the gate electrode and the oxide semiconductor layer;
a plurality of gate wiring lines extending in the row direction, each gate wiring line being formed from a conductive film the same as the gate electrode;
a plurality of source wiring lines extending in the column direction;
pixel electrodes, each pixel electrode being provided in each of the plurality of pixel areas and electrically connected to the pixel TFT;
an interlayer insulating layer provided to cover the oxide semiconductor layer, the gate electrode, and the plurality of gate wiring lines;
a common electrode provided on the interlayer insulating layer and including a plurality of segments, each segment being capable of functioning as a touch sensor electrode; and
a plurality of touch wiring lines extending in the column direction, each touch wiring line being connected to the corresponding touch sensor electrode, wherein the oxide semiconductor layer includes a channel region, a first low-resistive region, and a second low-resistive region, the first low-resistive region and the second low-resistive region being located on both sides of the channel region and having specific resistances lower than the channel region, the first low-resistive region being connected to any one of the plurality of source wiring lines, the plurality of source wiring lines and the plurality of touch wiring lines are located between the main surface of the substrate and the lower insulating layer, and are formed from a conductive film the same as the plurality of light blocking layers, the pixel electrode is formed from an oxide film the same as the oxide semiconductor film, and is continuous with the second low-resistive region in the oxide semiconductor layer, the plurality of gate wiring lines and the plurality of source wiring lines are arranged such that a pair of gate wiring lines are connected to one pixel row and one source wiring line is connected to a pair of pixel columns, the pair of pixel columns including a first pixel column and a second pixel column adjacent to the first pixel column, and when viewed from a normal direction of the main surface of the substrate, each of the plurality of source wiring lines is disposed between the first pixel column and the second pixel column in the corresponding pair of pixel columns, and each of the plurality of touch wiring lines is disposed between two adjacent pixel columns between two adjacent source wiring lines of the plurality of source wiring lines.

Item 2

The active matrix substrate described in item 1 further includes a connection electrode formed from a transparent conductive film the same as the common electrode, the connection electrode connecting any of the plurality of source wiring lines to the first low-resistive region of the oxide semiconductor layer in the pixel TFT.

Item 3

In the active matrix substrate described in item 2, the connection electrode connects any one of the plurality of source wiring lines to the first low-resistive region of the oxide semiconductor layer within a source contact hole formed in the interlayer insulating layer and the lower insulating layer.

Item 4

In the active matrix substrate described in item 1, the oxide semiconductor layer of the pixel TFT is disposed on the lower insulating layer and within a source contact hole formed in the lower insulating layer, and is connected to any one of the plurality of source wiring lines within the source contact hole.

Item 5

In the active matrix substrate described in any one of items 1 to 4, the touch sensor electrode is connected to any one of the plurality of touch wiring lines within a touch contact hole formed in the interlayer insulating layer and the lower insulating layer.

Item 6

In the active matrix substrate described in any one of items 1 to 5, the pair of gate wiring lines are adjacent to each other with the one pixel row interposed between the pair of gate wiring lines when viewed from the normal direction of the main surface of the substrate.

Item 7

In the active matrix substrate described in item 6, the pair of pixel columns includes a plurality of pixel sets, each pixel set being constituted by two pixel areas located in different pixel rows, the pixel electrodes and the oxide semiconductor layers in two pixel areas of each of the plurality of pixel sets are formed in one continuous oxide pattern, and the oxide pattern of each of the plurality of pixel sets is separated from an oxide pattern of another pixel set.

Item 8

In the active matrix substrate described in item 7, the first low-resistive regions of the oxide semiconductor layers in two pixel areas of each of the plurality of pixel sets are electrically connected to the one source wiring line at one common source contact portion.

Item 9

In the active matrix substrate described in any one of items 1 to 8, the plurality of source wiring lines and the plurality of touch wiring lines are arranged alternately in the row direction.

Item 10

The active matrix substrate described in any one of items 1 to 8 further includes at least one dummy touch wiring line located between the main surface of the substrate and the lower insulating layer, and formed from the conductive film the same as the plurality of light blocking layers, wherein the at least one dummy touch wiring line is not electrically connected to any of the touch sensor electrodes, and the plurality of source wiring lines, the plurality of touch wiring lines, and the at least one dummy touch wiring line are arranged alternately in the row direction.

Item 11

In the active matrix substrate described in any one of items 1 to 10, the active matrix substrate does not include an organic insulating layer between the common electrode and the substrate.

Item 12

In the active matrix substrate described in any one of items 1 to 11, the pair of pixel columns includes, per pixel row, a pair of pixels constituted by a first pixel area and a second pixel area adjacent to each other, both of the first low-resistive regions of the pixel TFTs disposed in the first pixel area and the second pixel area are connected to the one source wiring line, and the gate electrode of the pixel TFT disposed in the first pixel area is connected to one of the pair of gate wiring lines, and the gate electrode of the pixel TFT disposed in the second pixel area is connected to the other of the pair of gate wiring lines.

Item 13

In the active matrix substrate described in any one of items 1 to 12, the oxide semiconductor layer includes an In—Ga—Zn—O based semiconductor.

Item 14

In the active matrix substrate described in item 13, the In—Ga—Zn—O based semiconductor includes a crystalline portion.

Item 15

An in-cell touch panel liquid crystal display device including a plurality of pixels, the in-cell touch panel liquid crystal display device including:

the active matrix substrate according to any of items 1 to 14;

a counter substrate disposed to face the active matrix substrate; and a liquid crystal layer provided between the active matrix substrate and the counter substrate, wherein the in-cell touch panel liquid crystal display device includes the plurality of pixels corresponding to the plurality of pixel areas in the active matrix substrate, and display is performed by double gate drive in which each pixel row is scanned two times within one vertical scanning period, where some of pixels in each pixel row are selected in the first time scan and the rest of the pixels are selected in the second scan.

Item 16

A manufacturing method of an active matrix substrate, the active matrix substrate being according to any one of items 1 to 14, the manufacturing method including:

(a) depositing a first conductive film on the main surface of the substrate, and then, patterning the first conductive film to form the plurality of light blocking layers, the plurality of source wiring lines, and the plurality of touch wiring line;

(b) forming the lower insulating layer to cover the plurality of light blocking layers and the plurality of source wiring lines, and then, depositing an oxide semiconductor film on the lower insulating layer, and then, patterning the oxide semiconductor film;

(c) depositing an insulating film and a second conductive film in this order to cover the oxide semiconductor film, and then, patterning the insulating film and the second conductive film to form the gate insulating layer, the gate electrode, and the plurality of gate wiring lines;

(d) forming the interlayer insulating layer to cover the oxide semiconductor layer, the gate electrode, and the plurality of gate wiring lines;

(e) forming a plurality of touch contact holes in the interlayer insulating layer and the lower insulating layer, each touch contact hole exposing a portion of any one of the plurality of touch wiring lines; and (f) depositing a transparent conductive film on the interlayer insulating layer, and then, patterning the transparent conductive film to form the common electrode including the plurality of segments, each segment functioning as the touch sensor electrode, the touch sensor electrode being connected to any one of the plurality of touch wiring lines within at least one touch contact hole of the plurality of touch contact holes, and the manufacturing method further including:

(g) lowering a resistance of a portion of the oxide semiconductor to obtain the first low-resistive region, the second low-resistive region, and the pixel electrode.

Item 17

In the manufacturing method of the active matrix substrate described in item 16, the (e) forming a plurality of touch contact holes includes forming a plurality of source contact holes with the plurality of touch contact holes in the interlayer insulating layer and the lower insulating layer, each source contact hole exposing a portion of the first low-resistive region of the oxide semiconductor layer and a portion of any one of the plurality of source wiring lines, and the (f) depositing a transparent conductive film includes patterning the transparent conductive film to form a connection electrode with the common electrode, the connection electrode connecting any one of the plurality of source wiring lines to the first low-resistive region within any one of the plurality of source contact holes.

Item 18

In the manufacturing method of the active matrix substrate described in item 16 or 17, the (b) forming the lower insulating layer includes patterning the oxide semiconductor film to form a plurality of oxide patterns separated from each other, each of the plurality of oxide patterns being disposed for two pixel areas of the plurality of pixel areas and including a portion corresponding to the pixel electrodes and the oxide semiconductor layers of the two pixel areas.

According to an embodiment of the present disclosure, it is possible to reduce manufacturing processes of an active matrix substrate including an oxide semiconductor TFT having a top gate structure as a pixel TFT and manufacturing processes of an in-cell touch panel having such an active matrix substrate to reduce manufacturing costs.

BRIEF DESCRIPTION OF DRAWINGS

The disclosure will be described with reference to the accompanying drawings, wherein like numbers reference like elements.

FIG. 9 is a flowchart illustrating an example of a manufacturing method of the active matrix substrate 901 in the comparative example.

DESCRIPTION OF EMBODIMENTS

Figure 1A:
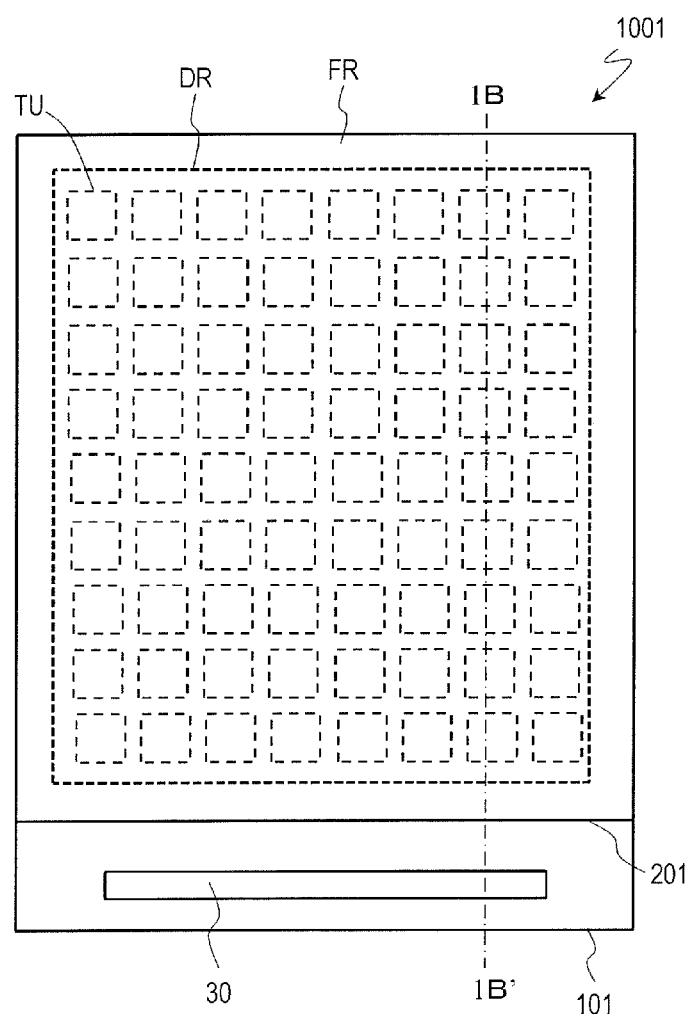
FIG. 1A is a plan view schematically illustrating a liquid crystal display device (in-cell touch panel) 1001 according to an embodiment of the present disclosure.

Hereinafter, embodiments of the present disclosure will be described with reference to the accompanying drawings. Note that the present disclosure is not limited to the embodiments to be described below. In the drawings referenced below, components having substantially the same function may be denoted by common reference symbols and descriptions thereof may be omitted. Furthermore, for ease of explanation, configurations are simplified or schematically illustrated and some components are omitted in the drawings referenced below. The dimensional ratio between the components illustrated in each drawing is not necessarily indicative of the actual dimensional ratio.

First Embodiment

An active matrix substrate according to a first embodiment of the present disclosure is used, for example, in an in-cell touch panel liquid crystal display device using a liquid crystal display panel in a transverse electrical field mode (for example, an FFS mode). First, an overview of a liquid crystal display device will be described.

Overall Structure of In-Cell Touch Panel Liquid Crystal Display Device

Figure 1B:
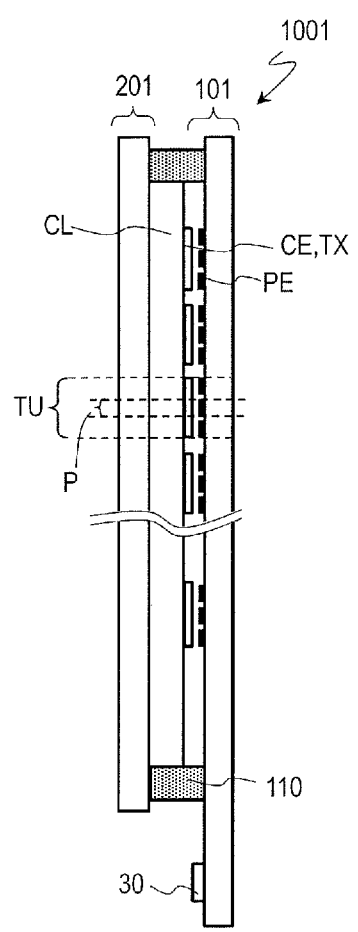
FIG. 1B is a cross-sectional view schematically illustrating the liquid crystal display device 1001, taken along a line 1B-1B' in FIG. 1A.

FIG. 1A is a schematic plan view of an in-cell touch panel liquid crystal display device (hereinafter simply referred to as a "liquid crystal display device") 1001 according to the first embodiment. FIG. 1B illustrates a cross section taken along a line 1B-1B' in FIG. 1A. The liquid crystal display device 1001 includes, for example, a self-capacitive touch sensor.

The liquid crystal display device 1001 includes a display region DR and a peripheral region (also referred to as a "frame region") FR located around the display region DR. The display region DR includes a plurality of gate wiring lines (not illustrated) extending substantially in parallel to a row direction, a plurality of source wiring lines (not illustrated) extending substantially in parallel to a column direction, and a plurality of pixels P arranged two-dimensionally in the row direction and the column direction. The column direction is a direction intersecting the row direction and may be orthogonal to the row direction.

The display region DR further includes a plurality of touch detection units TU two-dimensionally arranged. In the illustrated example, the touch detection units TU are arranged two-dimensionally in the row direction and the column direction. Each touch detection unit TU may be arranged corresponding to two or more pixels P, as illustrated in FIG. 1B.

On the other hand, the peripheral region FR is provided with peripheral circuits including drive circuits, terminal portions, and the like. Although not illustrated in the figure, the drive circuit includes a gate driver that supplies a scanning signal to the pixel TFT via the gate wiring line, a source driver that supplies a pixel signal to the pixel TFT via the source wiring line, a drive circuit (referred to as a "touch drive unit") for driving the touch sensor, and the like. These drive circuits are provided (mounted or integrally formed) on an active matrix substrate 101, for example. In this example, mounted on the active matrix substrate 101 is a semiconductor chip 30 that includes some drive circuits such as the touch drive unit and the source driver. Although not illustrated in the figure, the gate driver may be integrally (monolithically) formed on the active matrix substrate 101.

The liquid crystal display device 1001 includes the active matrix substrate 101, a counter substrate 201 arranged to face the active matrix substrate 101, and a liquid crystal layer CL provided between the active matrix substrate 101 and the counter substrate 201. The liquid crystal display device 1001 is typically further provided with a backlight (illumination device) disposed on a back face side (opposite to a viewer) of the active matrix substrate 101. The liquid crystal layer CL is enclosed between the active matrix substrate 101 and the counter substrate 201 and sealed by a sealing member 110.

The active matrix substrate 101 includes a plurality of pixel electrodes PE and a common electrode CE as a pair of electrodes for applying a voltage to the liquid crystal layer CL. Although not illustrated in the figure, an alignment film (horizontal alignment film) is provided on an outermost surface of the active matrix substrate 101 to come into contact with the liquid crystal layer CL.

The counter substrate 201 has a color filter and a black matrix (both not illustrated). A horizontal alignment film (not illustrated) is provided also on an outermost surface of the counter substrate 201 to come into contact with the liquid crystal layer CL.

Although not illustrated here, the liquid crystal display device 1001 includes a pair of polarizers that face each other with at least the liquid crystal layer CL interposed therebetween. For example, one of the pair of polarizers is disposed on the back face side of the active matrix substrate 101, and the other is disposed on a front face side of the counter substrate 201.

The liquid crystal display device 1001 includes a touch sensor built therein. The touch sensor includes an electrode for the touch sensor (hereinafter, a "touch sensor electrode") TX and a wiring line for the touch sensor (not illustrated) (hereinafter, referred to as a "touch wiring line"). The touch sensor electrodes TX and the touch wiring line are provided on the active matrix substrate 101.

The touch sensor electrode TX is disposed for each touch detection unit TU. In this example, the common electrode CE is separated into a plurality of segments, and each segment also functions as the touch sensor electrode TX. Each touch sensor electrode TX is connected through the corresponding touch wiring line to the touch drive unit provided on the semiconductor chip 30.

Figure 1C:
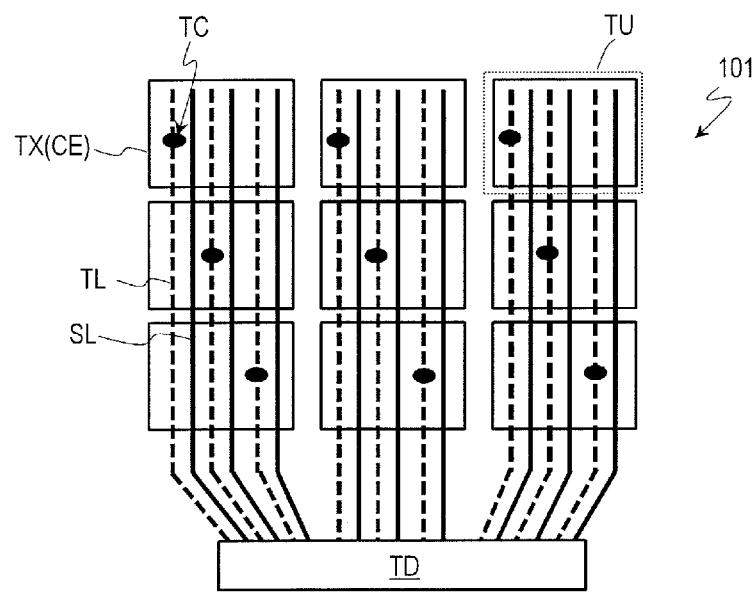
FIG. 1C is a plan view illustrating an arrangement relationship between a touch sensor electrode, a source wiring line, and a touch wiring line in an active matrix substrate 101.

FIG. 1C is a schematic plan view illustrating an arrangement relationship between the touch sensor electrode, the touch wiring line, and the source wiring line in the active matrix substrate 101. For the purpose of simplicity, a case is illustrated that the touch detection units TU are arranged in three rows and three columns. Each touch detection unit TU is arranged corresponding to a plurality of pixels (not illustrated). The number of touch detection units TU is not limited to the illustrated example.

Further, the active matrix substrate 101 includes a plurality of touch sensor electrodes TX each of which is provided for each touch detection unit TU, a plurality of touch wiring lines TL extending in a column direction, and a plurality of source wiring lines SL extending in a column direction.

Each source wiring line SL is connected to a pixel TFT (not illustrated) of a corresponding pixel. Each touch sensor electrode TX is electrically connected to a corresponding touch wiring line TL. A connection portion TC between the touch sensor electrode TX and the touch wiring line TL is referred to as a "touch wiring line contact portion". At least one touch wiring line TL may be provided for one touch sensor electrode TX. Two or more touch wiring line contact portions TC may be provided for one touch sensor electrode TX.

The touch wiring line TL is connected to a touch drive unit TD provided in a non-display region. As described above, each touch sensor electrode TX also functions as the common electrode CE. The touch drive unit TD is configured to switch in a time division manner between a display mode in which the plurality of touch sensor electrodes TX function as the common electrode CE and a touch detection mode in which the plurality of touch sensor electrodes TX function as the touch sensor electrodes TX. The touch drive unit TD, for example, applies a common signal to the touch sensor electrode TX (common electrode CE) via the touch wiring line TL in the display mode. On the other hand, in the touch detection mode, the touch drive unit TD applies a touch drive signal to the touch sensor electrode TX via the touch wiring line TL.

Although the above describes an example in which the liquid crystal display device 1001 includes a self-capacitive touch sensor, the liquid crystal display device 1001 may instead include a mutual capacitive touch sensor. In this case, another electrode for the touch sensor may be provided on the counter substrate disposed to face the active matrix substrate 101 with the liquid crystal layer interposed therebetween. For example, the touch sensor electrode TX may extend in one direction (e.g., the row direction), the electrode for the touch sensor provided on the counter substrate extend in another direction (for example, in the column direction), and a change in a capacitance of an intersecting portion (touch detection unit) of these electrodes may be detected. Specific structures, driving methods, and the like of the mutual capacitive and self-capacitive touch sensors are described in, for example, JP 2018-5484 A, WO 2018/092758 A, WO 2017/126603 A, JP 2016-126336 A, and the like and are publicly known, so detailed description thereof is omitted. The entire contents of the disclosures of JP 2018-5484 A, WO 2018/092758 A, WO 2017/126603 A, and JP 2016-126336 A are incorporated herein by reference.

Note that, herein, regardless of whether the touch sensor formed on the active matrix substrate 101 is a self-capacitive type or a mutual capacitive type, the electrode for the touch sensor disposed on the active matrix substrate 101 side is simply referred to as the "touch sensor electrode TX", and the wiring line for the touch sensor electrically connected to the touch sensor electrode TX is referred to as the "touch wiring line".

Drive Method for Liquid Crystal Display Device 1001 and Pixel Structure of Active Matrix Substrate 101

The liquid crystal display device 1001 according to the present embodiment performs display by scanning each pixel row two times within one vertical scanning period. In the first scan, some of pixels in each pixel row are selected, and in the second scan, the remaining pixels are selected. Such a driving method is referred to herein as "double gate drive" (or "dual gate drive", "double scan drive").

The active matrix substrate 101 of the liquid crystal display device 1001 is configured to enable the double gate drive. A structure of the active matrix substrate 101 for double gate driving is referred to as a "double gate drive structure." In the double gate drive structure, two gate wiring lines GL (a pair of gate wiring lines) are provided for one pixel row. In addition, one source wiring line SL is provided for two adjacent pixel columns (a pair of pixel columns), and each pixel in the pair of pixel columns share the same source wiring line.

Hereinafter, an example of a pixel structure in the active matrix substrate 101 will be described more specifically with reference to the drawings. Note that, a portion of the active matrix substrate 101 corresponding to a pixel of the liquid crystal display device 1001 is referred to herein as a "pixel area" or a "pixel".

Figure 2A:
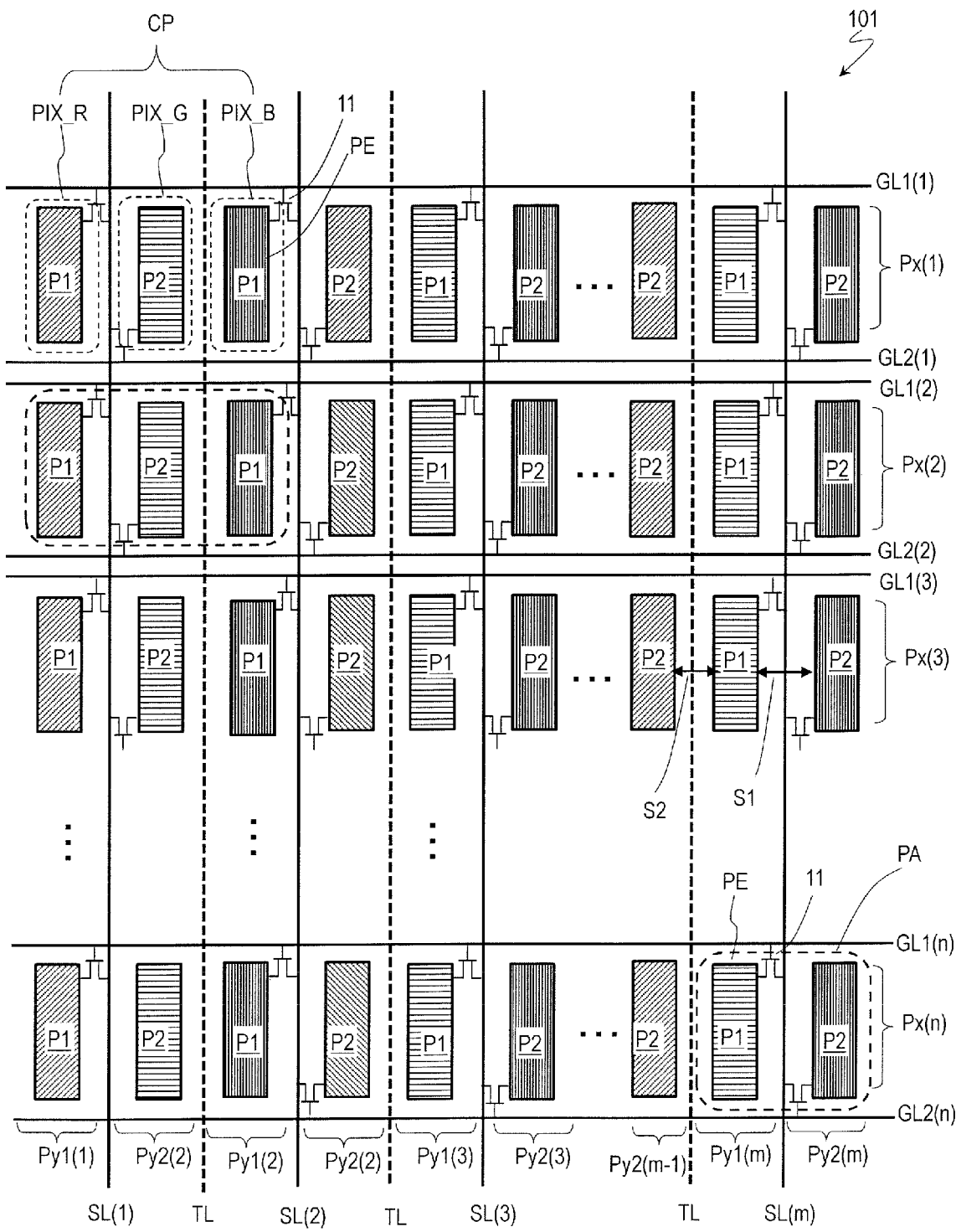
FIG. 2A is a plan view illustrating a pixel structure in the active matrix substrate 101.

FIG. 2A is a plan view illustrating the pixel structure in the active matrix substrate 101. For the purpose of simplicity, the touch detection unit TU (or the touch sensor electrode TX) is not illustrated.

In the active matrix substrate 101, a plurality of pixel areas PIX are arrayed in a matrix shape including a plurality of rows (pixel rows) px and a plurality of columns (pixel column) py. A pixel TFT 11 and the pixel electrode PE are disposed in each pixel area PIX. Each pixel TFT 11 has a source side electrically connected to one corresponding source wiring line SL, and a drain side electrically connected to the corresponding pixel electrode PE.

The plurality of pixel areas PIX constitute a plurality of color display pixels CP. Each of the plurality of color display pixels CP is constituted by three pixels that exhibit colors different from each other, namely, a red pixel PIX_R, a green pixel PIX_G, and a blue pixel PIX_B. In each of the color display pixels CP, the red pixel PIX_R, the green pixel PIX_G, and the blue pixel PIX_B are arranged in the row direction (sometimes referred to as a "vertical stripe arrangement"). Although not illustrated, the red pixel PIX_R, the green pixel PIX_G, and the blue pixel PIX_B may be arranged in the column direction ("horizontal stripe arrangement"). Note that FIG. 2A illustrates the example in which the color display pixels CP are constituted by three pixels exhibiting the colors different from each other, but the color display pixels CP may be constituted by four or more pixels exhibiting colors different from each other. For example, a plurality of pixels constituting one color display pixel CP may include a yellow pixel displaying yellow in addition to red pixel, the green pixel, and the blue pixel.

As described above, the active matrix substrate 101 has the double gate drive structure. In a case where the total number of pixel rows px is N and the total number of pixel columns py is M in the pixel areas PIX, 2×N gate wiring lines GL and M/2 source wiring lines SL are used for the pixel areas PIX of N rows and M columns.

Each of the plurality of source wiring lines SL is connected to a pair of pixel columns constituted by two adjacent pixel columns py. Here, the plurality of source wiring lines SL are referred to as the source wiring lines SL(1), SL(2), . . . , SL(M) from one end (from the left in the figure), and two pixel columns corresponding to the source wiring line SL(m) (m is an integer of 1 or more) are referred to as a first pixel column py1(*m*) and a second pixel column py2(*m*). The source wiring line SL(m) is disposed between the first pixel column py1(*m*) and the second pixel column py2(*m*). In these pixel columns py1(*m*) and py2(*m*), the pixel TFT 11 in each pixel area PIX has the source side electrically connected to the source wiring line SL(m).

On the other hand, the plurality of gate wiring lines GL includes a plurality of pairs of gate wiring lines connected to one row of pixel px. Here, the plurality of pixel rows px are referred to as the pixel rows px(1), px(2), . . . , px(N) from one end (from the top in the figure), and a pair of gate wiring lines corresponding to the pixel row px(n) (n is an integer of 1 or more) are referred to as a first gate wiring line GL1(*n*) and a second gate wiring line GL2(*n*). The first gate wiring line GL1(*n*) and the second gate wiring line GL2(*n*) are adjacent to each other with the pixel row px(n) interposed therebetween. That is, the first gate wiring line GL1(*n*) is disposed between the pixel row px(n) and the pixel row px(n−1) above the pixel row, and the second gate wiring line GL2(*n*) is disposed between the pixel row px(n) and the pixel row px(n+1) below the pixel row.

The pair of pixel columns py1(*m*) and py2(*m*) include a pair of pixels PA constituted by two adjacent pixel areas PIX for each pixel row. In one pixel area PIX of the pair of pixels PA, a gate electrode of the pixel TFT 11 is connected to the first gate wiring line GL1(*n*), and in the other pixel area PIX, a gate electrode of the pixel TFT 11 is electrically connected to the second gate wiring line GL2(*n*). The pixel area connected to the first gate wiring line GL1(*n*) (that is, one selected by the first gate wiring line GL1(*n*)) is referred to as a "first pixel area P1", and the pixel area connected to the second gate wiring line GL2(*n*) (that is, one selected by the second gate wiring line GL2(*n*)) is referred to as a "second pixel area P2". As described above, both the pixel TFTs 11 of the pixel areas P1 and P2 of each pair of pixels PA are connected to one corresponding source wiring line SL(m).

Accordingly, each pixel row px in the active matrix substrate 101 includes a plurality of first pixel areas P1 and a plurality of second pixel areas P2. In the liquid crystal display device 1001 using the active matrix substrate 101, the first gate wiring line GL1(*n*) and the second gate wiring line GL2(*n*) are selected in a time division manner in a horizontal scan period (1H) for driving the n-th pixel row px(n), for example. During the period while the first gate wiring line GL1(*n*) is selected, the pixel TFTs 11 of the plurality of first pixel areas P1 in the pixel row px(n) are in an on state by scanning signals supplied from the gate driver, and display signals are supplied from the source wiring line SL (m) to the pixel electrodes PE of the first pixel areas P1(*n*). During the period while the second gate wiring line GL2(*n*) is selected, the pixel TFTs 11 of the plurality of second pixel areas P2(*n*) in the pixel row px(n) are in an on state by scanning signals supplied from the gate driver, and display signals are supplied from the source wiring line SL (m) to the pixel electrodes PE of the second pixel areas P2(*n*). This operation is performed sequentially from the first row to the N-th row to write and display one image (frame) in the display region.

One source wiring line SL is disposed every two pixel columns py in the active matrix substrate 101. Each touch wiring line TL is disposed between two adjacent pixel columns (e.g., between the pixel columns py2(*m*) and py1 (*m*+1)) between two adjacent source wiring lines SL (e.g., between the source wiring lines SL(m) and SL(m+1)). Each touch wiring line TL extends substantially in parallel to the source wiring line SL (in the column direction), and is electrically connected to a corresponding touch sensor electrode (not illustrated). In this way, the present embodiment having the double gate drive structure allows the touch wiring line TL to be disposed between pixel columns where the source wiring line SL is not disposed.

In the active matrix substrate 101, pixel electrodes PE arranged in a pixel column and pixel electrodes PE arranged in another pixel column adjacent to the former pixel column are arranged at predetermined intervals (openings) S1 and S2 in the row direction. The opening S1 between the first pixel column py1(*m*) and the second pixel column py2(*m*) constituting a pair of pixel columns is referred to as a "first opening". The opening S2 between two adjacent pairs of pixel columns (between the pixel column py2(*m*−1) and the pixel column py1(*m*)) is referred to as a "second opening". Herein, "the source wiring line SL(m) being disposed between a pair of pixel columns py1(*m*) and py2(*m*)" includes a case that the source wiring line SL(m) extends in the column direction so as to at least partially overlap the first opening S1 between the pixel electrodes of two pixel columns py1(*m*) and py2(*m*) when viewed from a normal direction of the substrate plane. That is, when viewed from the normal direction of the substrate plane, the source wiring line SL(m) may not overlap any of the pixel electrodes PE of the pair of pixel columns py1(*m*) and py2(*m*), or may at least partially overlap any of the pixel electrodes PE (or may extend across a part of any of the pixel electrodes PE). Similarly, "the touch wiring line TL being disposed between two adjacent pixel columns py2(*m*−1) and py1(*m*)" includes a case that the touch wiring line TL extends in the column direction so as to at least partially overlap the second opening S2 between the pixel electrodes of the two pixel columns py2(*m*−1) and py1(*m*) when viewed from the normal direction of the substrate plane.

In the illustrated example, when viewed from the normal direction of the substrate plane, the source wiring line SL and the touch wiring line TL are arranged alternately in the row direction, but one touch wiring line TL may be arranged with respect to two or more source wiring lines SL depending on the number of touch sensor electrodes (the number of touch detection units TU). That is, no touch wiring line TL may be disposed between some pixel columns between two adjacent source wiring lines SL. Alternatively, a dummy touch wiring line that is not connected to the touch sensor electrode may be formed between such pixel columns. For example, when viewed from the normal direction of the substrate plane, the source wiring line SL and the touch wiring line TL or the dummy touch wiring line may be arranged alternately in the row direction. In this way, in a case where any of the source wiring line SL, the touch wiring line TL, and the dummy touch wiring line is formed between all of the pixel columns in the display region, it is possible to obtain a more homogeneous aperture ratio across the display region.

Figure 2B:
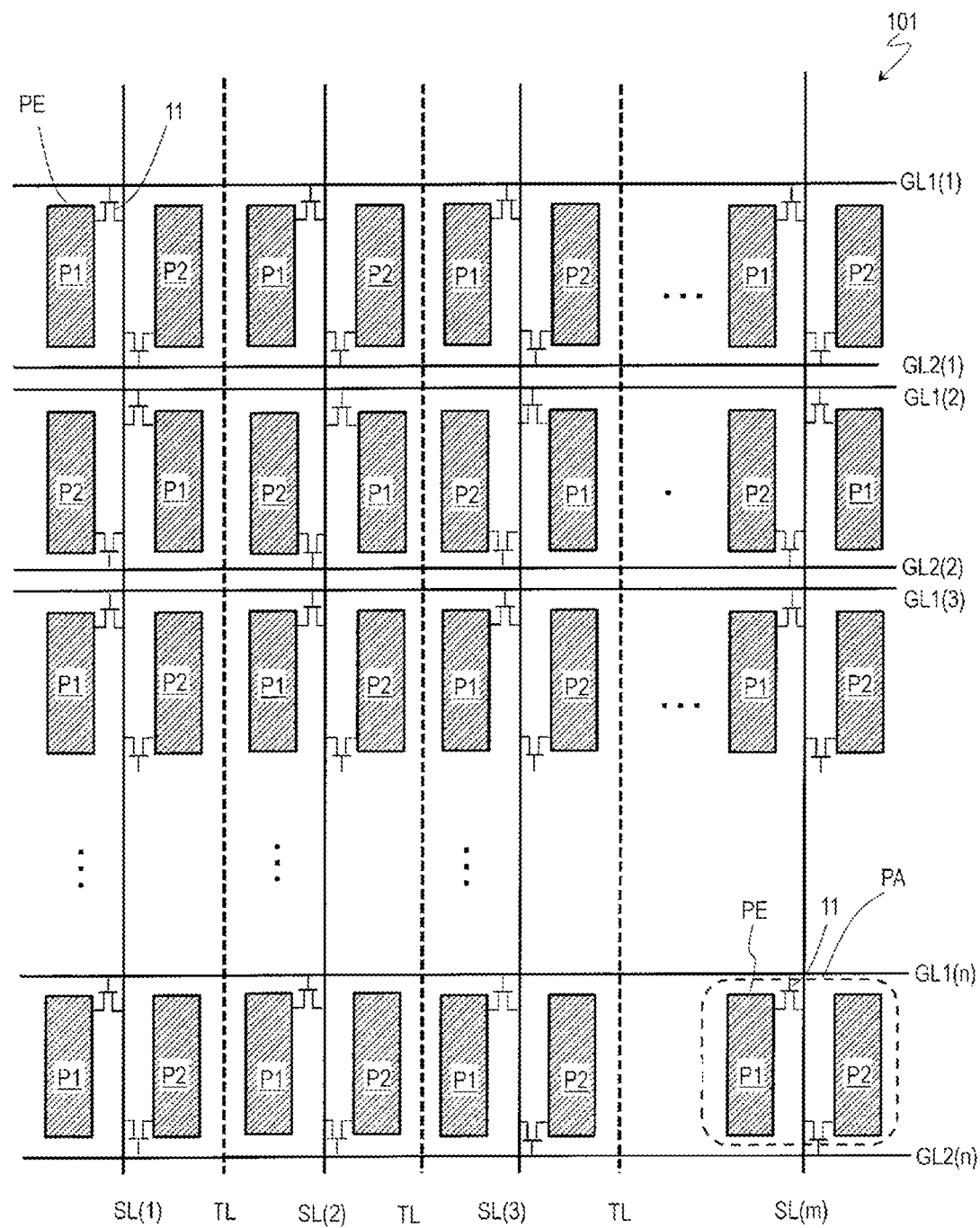
FIG. 2B is a plan view illustrating another pixel structure in the active matrix substrate 101.
Figure 2C:
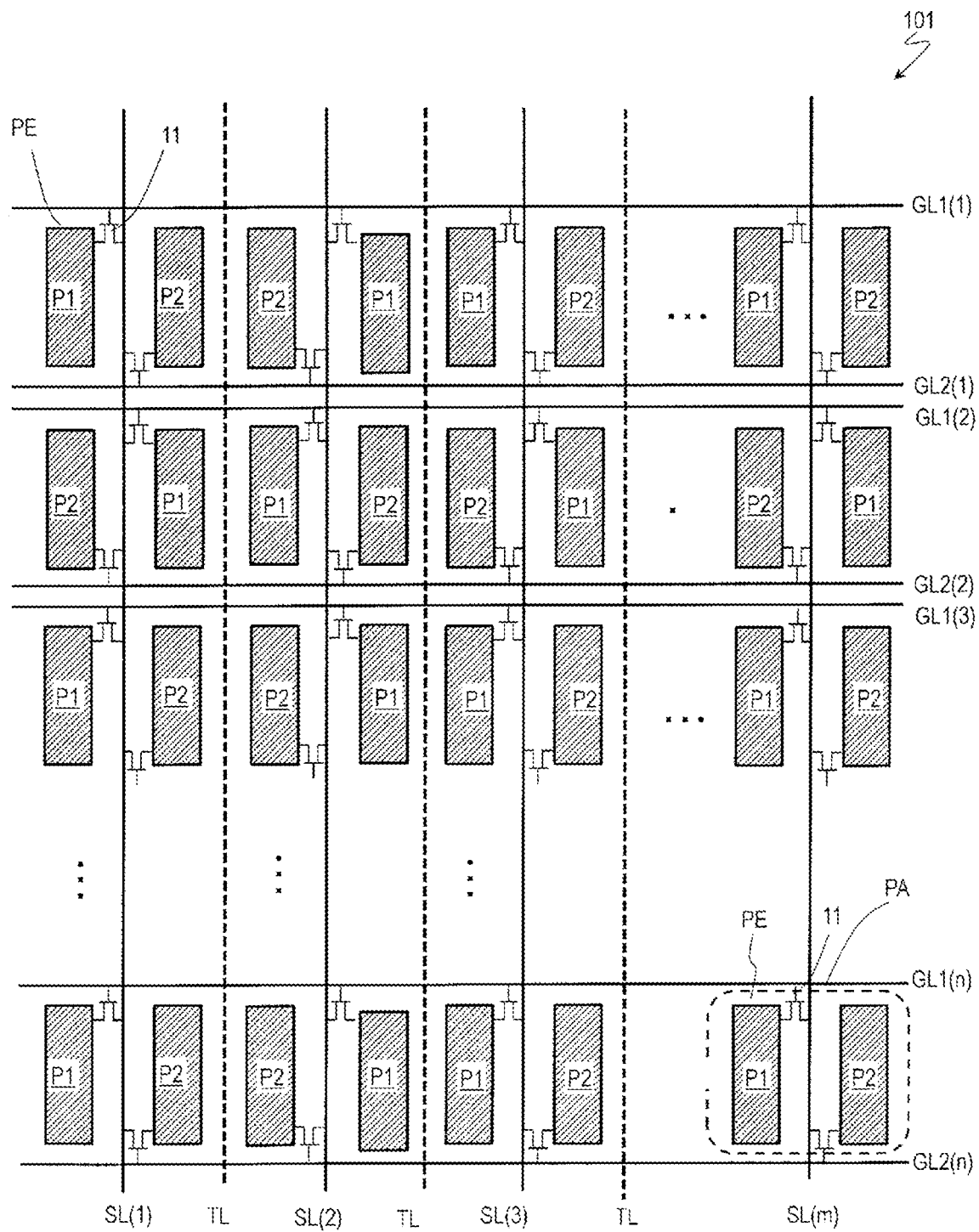
FIG. 2C is a plan view illustrating another pixel structure in the active matrix substrate 101.

The pixel structure in the active matrix substrate 101 is not limited to that illustrated in FIG. 2A. In FIG. 2A, the arrangements of the pixel areas P1 and P2 of the respective pairs of pixels may all be the same (the first pixel area P1 is on the left side and the second pixel area P2 is on the right side), but the arrangement may be varied for each pair of pixels. For example, as illustrated in FIG. 2B, the first pixel areas P1 and the second pixel areas P2 may be arranged alternately one by one in the row direction and the column direction (staggered arrangement). Alternatively, as illustrated in FIG. 2C, the first pixel areas P1 and the second pixel areas P2 may be arranged alternately two by two.

Note that an auxiliary wiring line that is connected to one touch sensor electrode TX and not connected to the touch drive unit TD may be further provided between two adjacent source wiring lines SL. The auxiliary wiring line is formed from the conductive film the same as the touch wiring line TL (that is, the same as the light blocking layer 14). By providing the auxiliary wiring line, an internal resistance of the touch sensor electrode TX can be reduced.

Figure 1D:
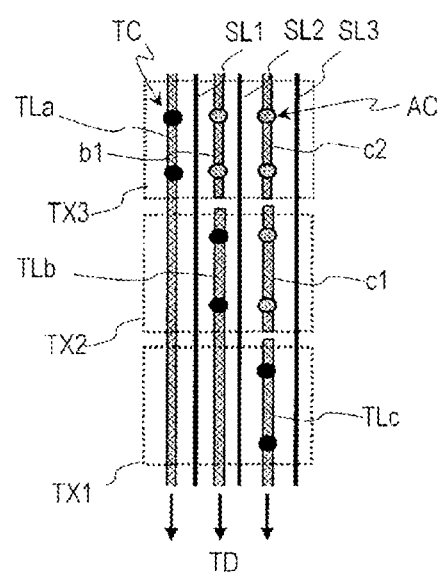
FIG. 1D is a plan view illustrating an arrangement relationship between a touch wiring line and an auxiliary wiring line in the active matrix substrate 101.

FIG. 1D is a schematic plan view illustrating an arrangement of the auxiliary wiring line and the touch wiring line, and illustrates only a portion of the display region. In the example illustrated in FIG. 1D, touch sensor electrodes TX1, TX2, and TX3 are arranged in the column direction from the touch drive unit TD side. The touch sensor electrodes TX1, TX2, and TX3 are electrically connected to the touch drive unit TD through touch wiring lines TLa, TLb, and TLc, respectively. When viewed from the normal direction of the substrate 101, the source wiring lines SL1 to SL3 extend in the column direction across the touch sensor electrodes TX1 to TX3. The touch wiring line TLb is disposed between the source wiring line SL1 and the source wiring line SL2, and the touch wiring line TLc is disposed between the source wiring line SL2 and the source wiring line SL3.

The touch wiring line TLb extends from the touch drive unit TD side to below the touch sensor electrode TX2 and is connected to the touch sensor electrode TX2, but is not extended below the touch sensor electrode TX3. Instead, an auxiliary wiring line b1 is provided below the touch sensor electrode TX3 between the source wiring line SL1 and the source wiring line SL2. The auxiliary wiring line b1 is separated (spaced apart) from the touch wiring line TLb and is connected to the touch sensor electrode TX3 at an auxiliary wiring line contact portion AC. A structure of the auxiliary wiring line contact portion AC may be the same as that of the touch wiring line contact portion TC. Similarly, the touch wiring line TLc extends from the touch drive unit TD side to below the touch sensor electrode TX1 and is connected to the touch sensor electrode TX1, but is not extended below the touch sensor electrodes TX2 and TX3. Instead, auxiliary wiring lines c1 and c2 are provided below the touch sensor electrodes TX2 and TX3, respectively, between the source wiring line SL2 and the source wiring line SL3. The auxiliary wiring lines c1 and c2 are connected to the touch sensor electrodes TX2 and TX3 at the auxiliary wiring line contact portions AC, respectively. The touch wiring line TLc, the auxiliary wiring line c1, and the auxiliary wiring line c2 are separated from each other.

As illustrated, each of the auxiliary wiring lines b1, c1, and c2 may be connected to the corresponding touch sensor electrode TX at two or more auxiliary wiring line contact portions AC. Each of the touch wiring lines TLa, TLb, and TLc may be connected to the corresponding touch sensor electrode TX at two or more touch contact portions TC.

In this manner, by providing the auxiliary wiring line between two adjacent source wiring lines SL and between pixel columns where no touch wiring line is disposed (not extended), the homogeneous aperture ratio across the display region can be ensured, and the internal resistance of each touch sensor electrode (in particular, the touch sensor electrode in a position farther from the touch drive unit TD) TX formed of the transparent conductive film can be reduced.

Structure of Pixel Area PIX in Active Matrix Substrate 101

Next, the structure of the pixel area PIX in the active matrix substrate 101 will be described more specifically.

Figure 3A:
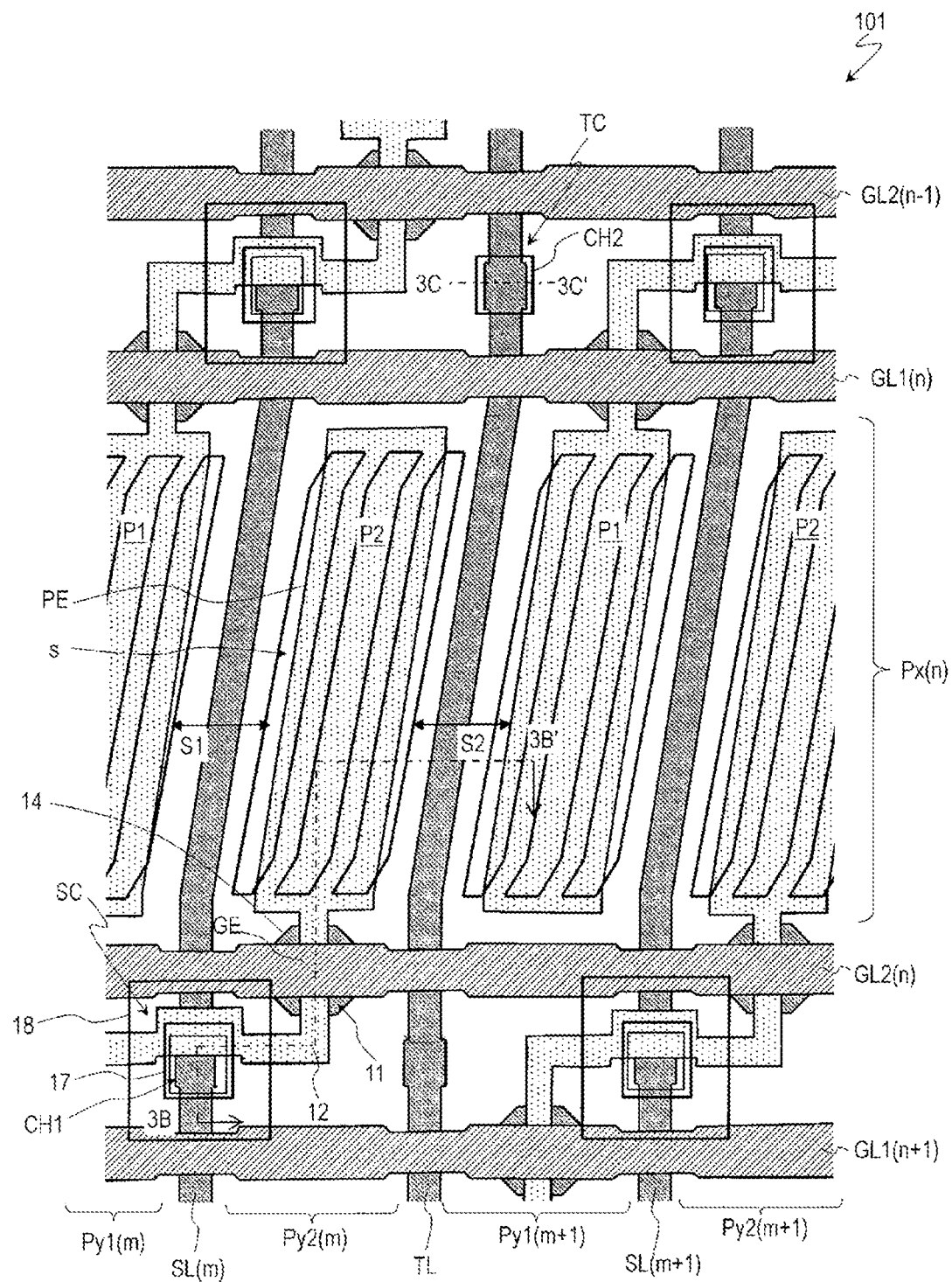
FIG. 3A is a plan view schematically illustrating the active matrix substrate 101.
Figure 3B:
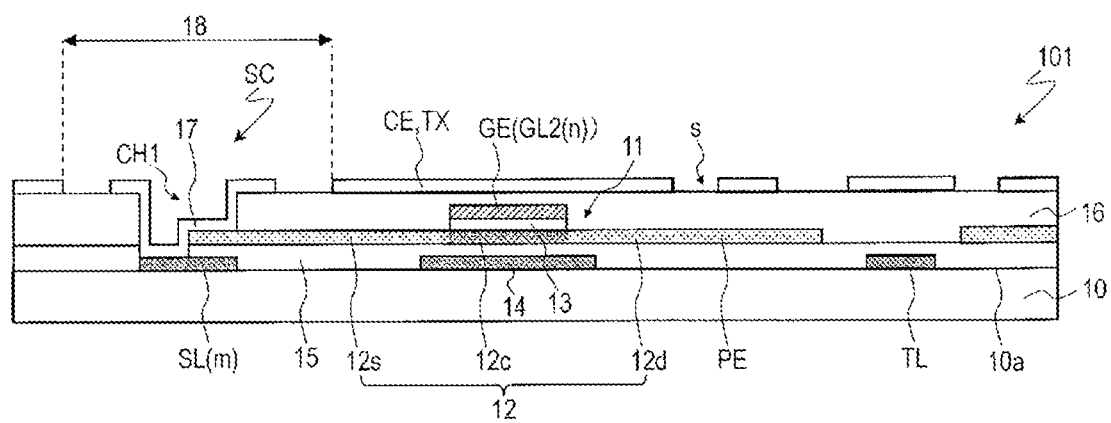
FIG. 3B is a cross-sectional view schematically illustrating the active matrix substrate 101, taken along a line 3B-3B' in FIG. 3A.
Figure 3C:
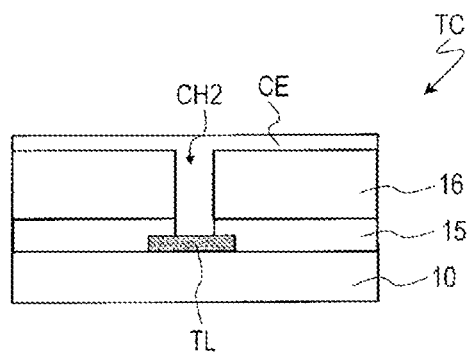
FIG. 3C is a cross-sectional view schematically illustrating the active matrix substrate 101, taken along a line 3C-3C' in FIG. 3A.
Figure 4A:
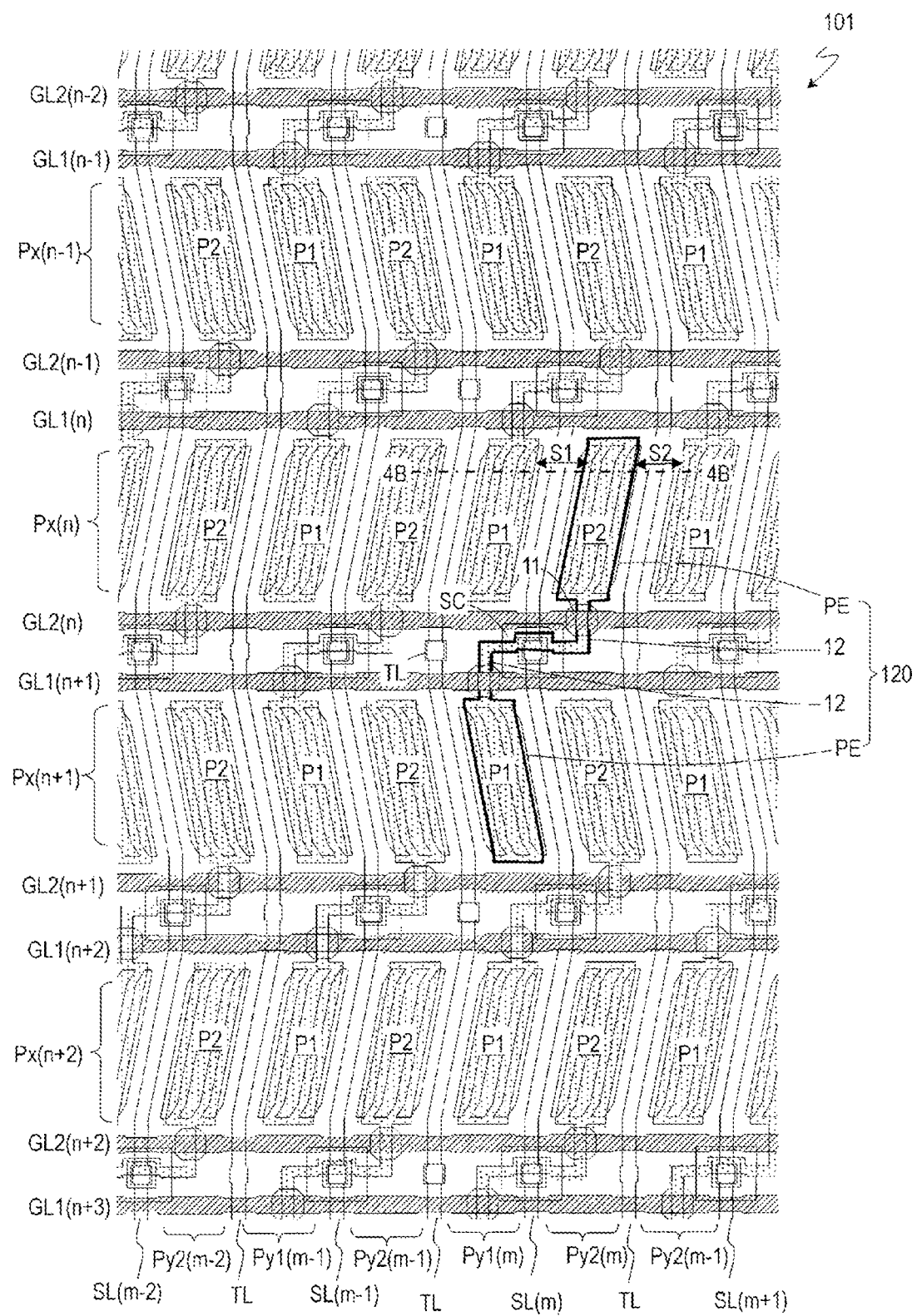
FIG. 4A is a plan view schematically illustrating the active matrix substrate 101.
Figure 4B:
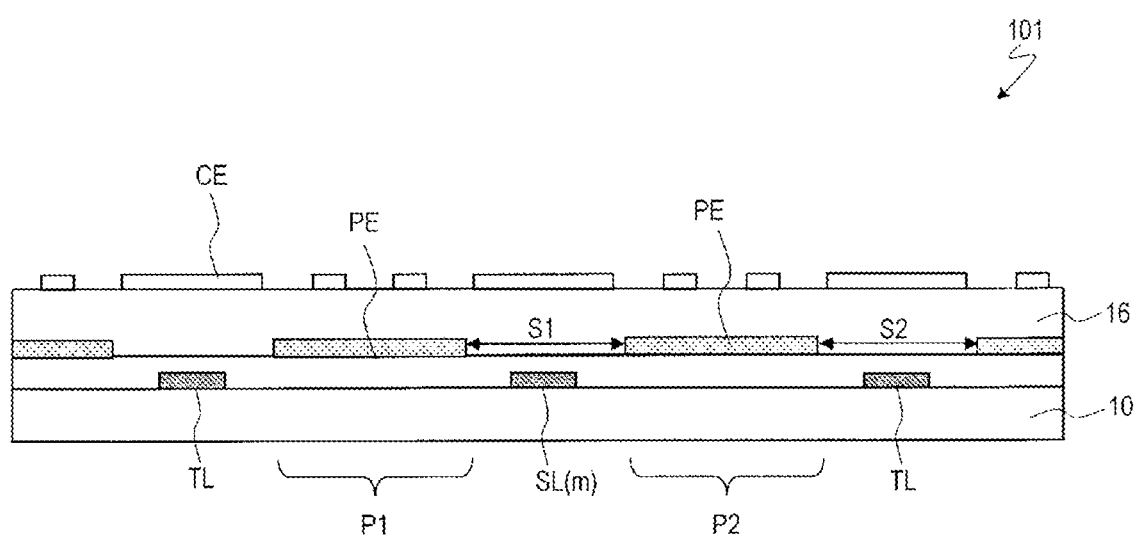
FIG. 4B is a cross-sectional view schematically illustrating the active matrix substrate 101, taken along a line 4B-4B' in FIG. 4A.

FIG. 3A is an enlarged plan view illustrating some of the pixel areas PIX in the active matrix substrate 101, and FIG. 3B is a cross-sectional view taken along a line 3B-3B' in FIG. 3A. FIG. 3C is a cross-sectional view taken along a line 3C-3C' in in FIG. 3A. FIG. 4A is an enlarged plan view illustrating more numbers of the pixel areas PIX in the active matrix substrate 101, and FIG. 4B is a cross-sectional view taken along a line 4B-4B' in FIG. 4A.

The active matrix substrate 101 includes a substrate 10 having a main surface 10a, the pixel TFTs 11 each provided corresponding to each of the plurality of pixel areas PIX, the plurality of gate wiring lines GL extending in the row direction, the plurality of source wiring lines SL extending in the column direction, and the plurality of touch wiring lines TL extending in the column direction. Furthermore, the active matrix substrate 101 includes the plurality of light blocking layers 14, a lower insulating layer 15, the pixel electrodes PE, an interlayer insulating layer 16, and the common electrode CE.

The substrate 10 is transparent and has insulating properties. The substrate 10 is, for example, a glass substrate or a plastic substrate.

The plurality of light blocking layers 14 are provided on the main surface 10a of the substrate 10. Each of the plurality of light blocking layers 14 is disposed corresponding to each of the pixel TFTs 11, as described below. The light blocking layer 14 is formed of a conductive material (for example, metal material) having light blocking properties.

The lower insulating layer 15 is provided to cover the plurality of light blocking layers 14. As the lower insulating layer 15, a silicon oxide ($SiO_2$) layer or a silicon nitride ($SiN_x$) layer can be used, for example. The lower insulating layer 15 may have a layered structure. For example, a silicon nitride layer may be included as a lower layer and a silicon oxide layer may be included as an upper layer.

The pixel TFT 11 includes an oxide semiconductor layer 12 provided on the lower insulating layer 15, a gate insulating layer 13 provided on the oxide semiconductor layer 12, and a gate electrode GE provided to face the oxide semiconductor layer 12 with the gate insulating layer 13 interposed therebetween. As such, the pixel TFT 11 is an oxide semiconductor TFT having the top gate structure. The pixel TFT 11 according to the present embodiment does not include a source electrode and a drain electrode formed of a metal material, as described in detail below.

The oxide semiconductor layer 12 includes a channel region 12c, and a first low-resistive region (source region) 12s and a second low-resistive region (drain region) 12d that have specific resistances lower than the channel region 12c. The channel region 12c overlaps the gate electrode GE when viewed from a normal direction of the main surface 10a of the substrate 10 (referred to as the normal direction of the substrate plane in the following description). The first low-resistive region 12s and the second low-resistive region 12d are located on both sides of the channel region 12c. The light blocking layer 14 disposed corresponding to each pixel overlaps at least the channel region 12c when viewed from the normal direction of the substrate surface.

As the gate insulating layer 13, the insulating layer illustrated as a specific example of the lower insulating layer 15 can be used. In a case that an oxide layer such as a silicon oxide layer is used as the gate insulating layer 13 (or, as a bottom layer of the gate insulating layer 13 in a case that the gate insulating layer 13 has a layered structure), oxygen deficiency produced in the channel region 12c can be reduced by the oxide layer.

The pixel electrode PE is provided to each of the plurality of pixels. The pixel electrode PE is electrically connected to the pixel TFT 11. In the present embodiment, the pixel electrode PE is formed from the oxide film the same as the oxide semiconductor layer 12. The pixel electrode PE is specifically formed by lowering the resistance of a portion of the oxide semiconductor film, and is continuous with the second low-resistive region 12d in the oxide semiconductor layer 12.

The plurality of gate wiring lines GL are formed from the conductive film (gate metal film) the same as the gate electrode GE. In the illustrated example, the gate electrode GE is integrally formed with any one of the plurality of gate wiring lines GL, and a portion of each gate wiring line GL overlapping the oxide semiconductor layer 12 functions as the gate electrode GE. In the following, all of the conductive layers formed from the gate metal film may be collectively referred to as the gate metal layer. In other words, the gate electrode GE and the gate wiring line GL can be said to be included in the gate metal layer. In the illustrated example, the gate insulating layer 13 is formed only in a region overlapping the gate metal layer when viewed from the normal direction of the substrate plane. In other words, an edge of the gate insulating layer 13 matches an edge of the gate metal layer.

The plurality of gate wiring lines GL include a plurality of pairs of gate wiring lines (a first gate wiring line GL1($n$) and a second gate wiring line GL2($n$)), each pair being disposed with respect to one pixel row px(n). In this example, the first gate wiring line GL1($n$) and the second gate wiring line GL2($n$) are adjacent to each other with the pixel electrode PE in the corresponding pixel row px(n) interposed therebetween when viewed from the normal direction of the substrate plane.

The interlayer insulating layer 16 is provided to cover the oxide semiconductor layer 12, the gate electrode GE, and the plurality of gate wiring lines GL. As the interlayer insulating layer 16, the insulating layer illustrated as a specific example of the lower insulating layer 15 can be used, and a silicon nitride layer can be used, for example.

The interlayer insulating layer 16 is, for example, an inorganic insulating layer. The active matrix substrate 101 does not include an organic insulating layer between the common electrode CE and the substrate 10.

The common electrode CE is provided on the interlayer insulating layer 16. The common electrode CE is formed of a transparent conductive material (e.g., ITO or IZO). At least one slit s is formed in the common electrode CE per pixel. Although FIG. 1 illustrates the example in which the common electrode CE has three slits s per pixel, the number and shape of slits s are not limited to the illustrated example. The common electrode CE is divided into a plurality of segments for each touch detection unit TU. Each segment functions as the touch sensor electrode TX.

The plurality of source wiring lines SL and the plurality of touch wiring lines TL are located between the main surface 10a of the substrate 10 and the lower insulating layer 15. The plurality of source wiring lines SL, the plurality of touch wiring lines TL, and the plurality of light blocking layers 14 are formed from the same conductive film (the source metal film). In the following, all the conductive layers formed from the source metal film may be collectively referred to as the source metal layer. Specifically, the plurality of source wiring lines SL, the plurality of touch wiring lines TL, and the plurality of light blocking layers 14 can be said to be included in the source metal layer.

In the present embodiment, one source wiring line SL(m) is arranged with respect to a pair of pixel columns constituted by two pixel columns adjacent to each other (the first pixel column py1($m$) and the second pixel column py2 ($m$)). The source wiring line SL(m) is disposed between these pixel columns py1($m$) and py2($m$). The first low-resistive region 12s of each pixel TFT 11 in the pixel columns py1($m$) and py2($m$) is connected to the source wiring line SL(m) at a source contact portion SC.

The pair of pixel columns includes, per pixel row, a pair of pixels constituted by the first pixel area P1 and the second pixel area P2 adjacent to the first pixel area P1. The gate electrode GE in the first pixel area P1 of the pair of pixels is connected to the first gate wiring line GL1($n$), and the gate electrode GE in the second pixel area P2 is connected to the second gate wiring line GL2($n$).

Each of the plurality of touch wiring lines TL is disposed between the pixel columns where no source wiring line SL is formed. One of the touch wiring lines TL is disposed between two adjacent pixel columns py2($m$) and py1($m$+1) between two adjacent source wiring lines SL(m) and SL(m+1), for example.

Each touch sensor electrode TX is electrically connected to the corresponding touch wiring line TL at the touch wiring line contact portion TC. Here, as illustrated in FIG. 3C, the touch sensor electrode TX is connected to the touch wiring line TL within a touch contact hole CH2 formed in the interlayer insulating layer 16 and the lower insulating layer 15. A position of the touch wiring line contact portion is not particularly limited. Here, the touch wiring line contact portion TC is provided between two gate wiring lines GL (the gate wiring line GL1($n$) and the gate wiring line GL2($n$−1) in the example illustrated in FIG. 3A) in an interval between two adjacent pixel rows when viewed from the normal direction of the substrate plane.

The active matrix substrate 101 may further include a connection electrode 17 formed from the transparent conductive film the same as the common electrode CE. In this example, the common electrode CE has an opening 18 at each source contact portion SC, and the connection electrode 17 may be formed inside the opening 18 to be spaced apart from the common electrode CE.

The connection electrode 17 connects any one of the plurality of source wiring lines SL to the first low-resistive region 12s of the oxide semiconductor layer 12 at the source contact portion SC. In the present embodiment, the connection electrode 17 connects any one of the plurality of source wiring lines SL to the first low-resistive region 12s of the oxide semiconductor layer 12 within a source contact hole CH1 formed in the interlayer insulating layer 16 and the lower insulating layer 15. When viewed from the normal direction of the substrate plane, the oxide semiconductor layer 12 may overlap substantially half of a region located within the source contact hole CH1 of the corresponding source wiring line SL. A position of the source contact portion SC is not particularly limited. Here, the source contact portion SC is disposed between two gate wiring lines GL in an interval between two adjacent pixel rows when viewed from the normal direction of the substrate plane.

As can be seen in FIG. 4A, every two pixel areas, the oxide semiconductor layers 12 and the pixel electrodes PE may be linked (integrally formed). One continuous pattern 120 including the pixel electrodes PE and oxide semiconductor layers 12 of two pixel areas is referred to herein as an "oxide pattern," and the two pixel areas constituting one oxide pattern 120 are referred to as a "pixel set". In the example illustrated in FIG. 4A, for two adjacent pairs of pixels in the column direction, the oxide semiconductor layer 12 and the pixel electrode PE of one pixel area (here, the second pixel area P2) in the upper pair of pixels, and the oxide semiconductor layer 12 and the pixel electrode PE of one pixel area (here, the first pixel area P1) in the lower pair of pixels are integrally formed in one oxide pattern 120. Note that in FIG. 4A, since the second pixel area P2 in the upper pair of pixels is located diagonally above the first pixel area P1 in the lower pair of pixels, the oxide pattern 120 extending in a direction inclined with respect to the column direction is formed. Although not illustrated, in the example illustrated in FIG. 2B, since the first pixel area P1 in the lower pair of pixels and the second pixel area P2 in the upper pair of pixels are located in the same pixel column, the oxide pattern 120 extending in the column direction is formed.

The oxide pattern 120 of each pixel set is separate (spaced apart) from the oxide patterns of other pixel sets. The plurality of oxide patterns 120 are arranged in the row direction and the column direction to obtain the pixel electrodes PE and the oxide semiconductor layers 12 in all the pixel areas.

In each oxide pattern 120, the first low-resistive regions 12s of the oxide semiconductor layers 12 of the two pixel areas are linked to each other, and are connected to the same source wiring line SL at the same source contact portion SC. In this example, the first low-resistive regions 12s in the pixel TFTs 11 of two pixel areas are connected to the source wiring line SL between these pixel areas within the same source contact hole CH1. In the active matrix substrate of the related art, one source contact portion is formed for each pixel area, whereas according to the configuration described above, one source contact portion SC may be formed for two pixel areas (a pixel set), so the number of source contact portions SC can be reduced to ½ compared to the related art. Therefore, a pixel aperture ratio can be further increased.

Manufacturing Method of Active Matrix Substrate 101

Figure 5:
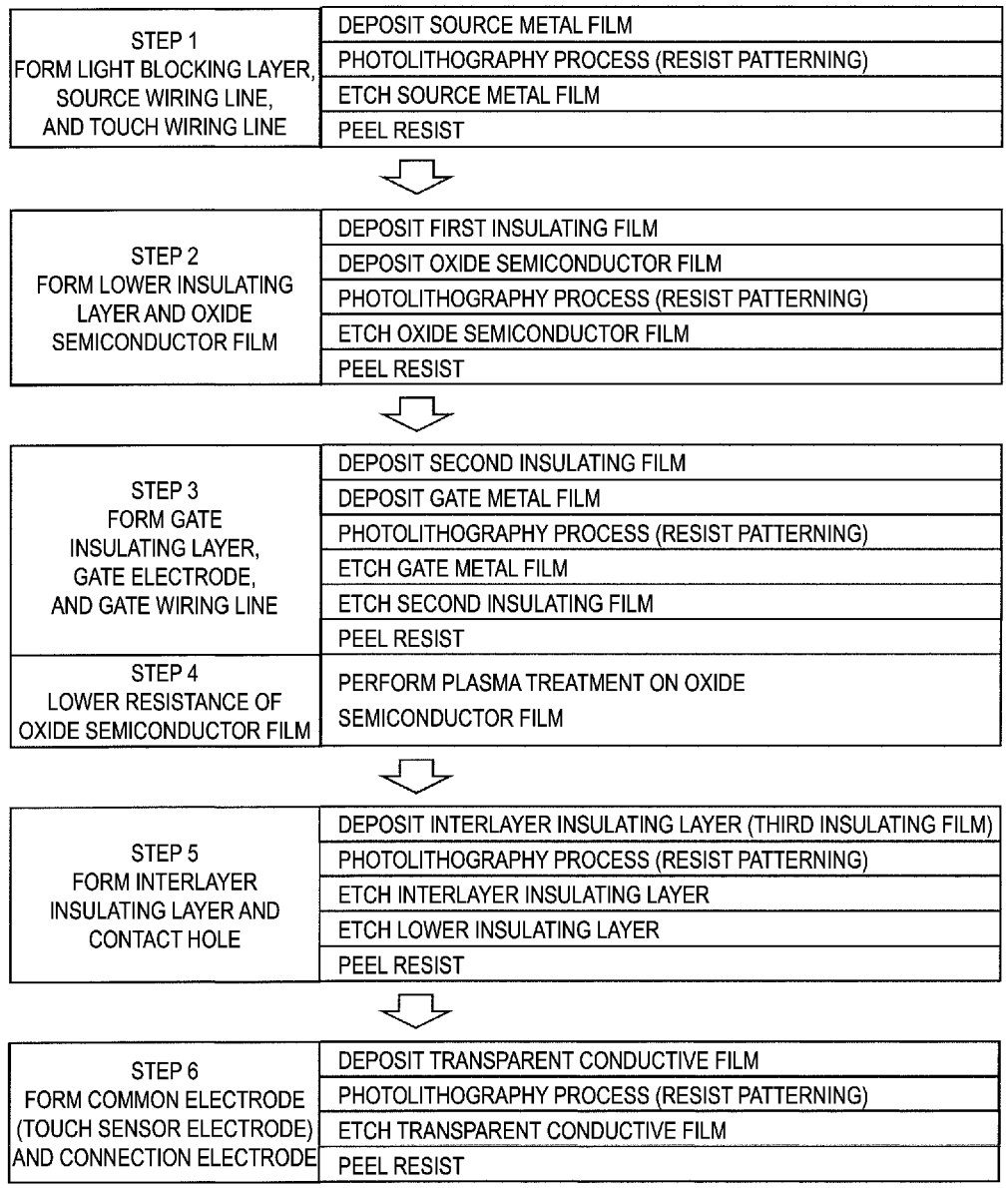
FIG. 5 is a flowchart illustrating an example of a manufacturing method of the active matrix substrate 101.

Next, a manufacturing method of the active matrix substrate 101 will be described with reference to FIG. 5, FIG. 6A to FIG. 6D, and FIGS. 7A to 7D. FIG. 5 is a flowchart illustrating an example of the manufacturing method of the active matrix substrate 101. Each of FIGS. 6A to 6D, and FIGS. 7A to 7D is a process cross-sectional view illustrating an example of the manufacturing method of the active matrix substrate 101.

STEP 1: Form Light Blocking Layer 14, Source Wiring Line SL, and Touch Wiring Line TL.

Figure 6A:
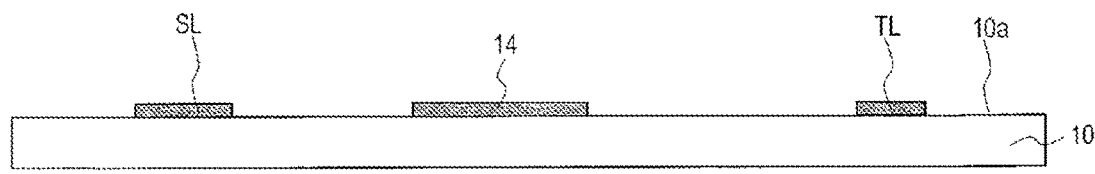
FIG. 6A is a process cross-sectional view illustrating an example of the manufacturing method of the active matrix substrate 101.

As illustrated in FIG. 6A, the light blocking layer 14, the source wiring line SL, and the touch wiring line TL are formed on the main surface 10a of the substrate 10. Specifically, first, a source metal film (a first conductive film) is deposited on the main surface 10a of the substrate 10 by, for example, sputtering, and then, the source metal film is patterned such that the light blocking layer 14 and the source wiring line SL can be formed. Patterning of the source metal film is performed by sequentially performing a photolithography process (patterning of a resist), etching of the source metal film, and peeling of the resist.

A glass substrate, a silicon substrate, a plastic substrate (resin substrate) having heat resistance, or the like can be used as the substrate 10.

Examples of the source metal film include a metal film containing an element selected from aluminum (Al), chromium (Cr), copper (Cu), tantalum (Ta), titanium (Ti), molybdenum (Mo), or tungsten (W), an alloy film containing these elements, and the like. A layered film including a plurality of films of these films may be used. For example, a layered film having a triple-layer structure of titanium film-aluminum film-titanium film, or a triple-layer structure of molybdenum film-aluminum film-molybdenum film can be used. Note that the source metal film is not limited to a triple-layer structure, but may have a single layer or a dual-layer structure, or a four or more-layered structure. Here, a layered film having a lower layer of a Ti film (thickness of 15 nm or more and 70 nm or less) and an upper layer of a Cu film (thickness of 200 nm or more and 400 nm or less) is used as the source metal film.

STEP 2: Form Lower Insulating Layer 15 and Oxide Semiconductor Film 12'.

Figure 6B:
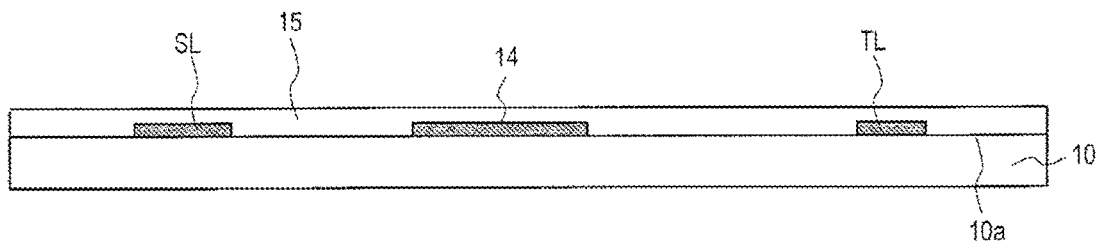
FIG. 6B is a process cross-sectional view illustrating an example of the manufacturing method of the active matrix substrate 101.

As illustrated in FIG. 6B, a first insulating film is deposited to cover the light blocking layer 14, the source wiring line SL, and the touch wiring line TL to form the lower insulating layer 15.

Examples of the lower insulating layer 15 appropriately include a silicon oxide ($SiO_2$) layer, a silicon nitride (SiNx) layer, a silicon oxynitride (SiOxNy; x>y) layer, a silicon nitride oxide (SiNxOy; x>y) layer, an aluminum oxide layer, a tantalum oxide layer, or the like. The lower insulating layer 15 may have a layered structure. Here, for example, a layered film having a lower layer of a silicon nitride (SiNx) layer (thickness of 50 nm or more and 600 nm or more) and an upper layer of a silicon oxide ($SiO_2$) layer (thickness of 50 nm or more and 600 nm or more) is formed as the lower insulating layer 15 by CVD. In a case that an oxide film such as a silicon oxide film is used as the lower insulating layer 15 (or, the top layer of the lower insulating layer 15, in a case that the lower insulating layer 15 has a layered structure), oxygen deficiency generated in the channel region 12c of the oxide semiconductor layer 12 that is subsequently formed can be reduced by the oxide film, and thus, lowering of the resistance of the channel region 12c can be suppressed.

Figure 6C:
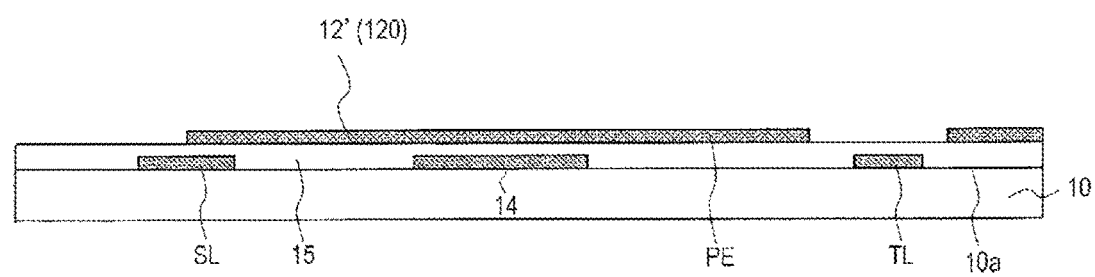
FIG. 6C is a process cross-sectional view illustrating an example of the manufacturing method of the active matrix substrate 101.

Next, as illustrated in FIG. 6C, an oxide semiconductor film 12' is deposited on the lower insulating layer 15, and then, the oxide semiconductor film 12' is patterned.

Patterning of the oxide semiconductor film 12' forms a plurality of oxide patterns 120 separated from one another. Here, one oxide pattern 120 is formed per two pixel areas (a pixel set) that are arranged in the pixel rows different from each other. Each oxide pattern 120 includes a portion corresponding to the pixel electrodes and the oxide semiconductor layers of two pixel areas.

Patterning of the oxide semiconductor film 12' is performed by sequentially performing a photolithography process (patterning of a resist), etching of the oxide semiconductor film 12', and peeling of the resist. The oxide semiconductor film 12' is, for example, an In—Ga—Zn—O based semiconductor film having a thickness of 15 nm or more and 200 nm or less that is formed by sputtering.

STEP 3: Form Gate Insulating Layer 13, Gate Electrode GE, and Gate Wiring Line GL.

Figure 6D:
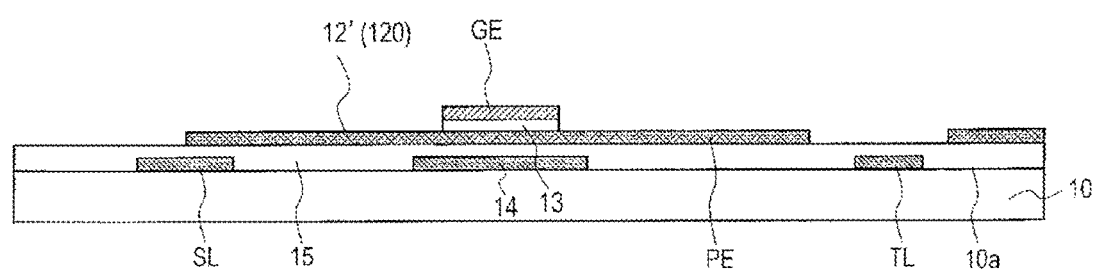
FIG. 6D is a process cross-sectional view illustrating an example of the manufacturing method of the active matrix substrate 101.

As illustrated in FIG. 6D, a second insulating film and a gate metal film (a second conductive film) are deposited in this order to cover the oxide semiconductor film 12', and then, the gate metal film and the second insulating film are patterned to form the gate insulating layer 13, the gate electrode GE, and the gate wiring line GL. Patterning of the gate metal film and the second insulating film is performed by sequentially performing a photolithography process (patterning of a resist), etching of the gate metal film, etching of the second insulating film, and peeling of the resist.

As the second insulating film, an insulating film similar to the lower insulating layer 15 (an insulating film illustrated as the lower insulating layer 15) can be used. In a case that an oxide film such as a silicon oxide film is used as the second insulating film, oxygen deficiency generated in the channel region 12c of the oxide semiconductor layer 12 can be reduced by the oxide film, and thus, lowering of the resistance of the channel region can be suppressed. Here, a silicon oxide ($SiO_2$) film having a thickness of 80 nm or more and 250 nm or less is formed as the second insulating film by CVD.

Examples the gate metal film include a metal film containing an element selected from aluminum (Al), chromium (Cr), copper (Cu), tantalum (Ta), titanium (Ti), molybdenum (Mo), or tungsten (W), an alloy film containing these elements, and the like. A layered film including a plurality of films of these films may be used. For example, a layered film having a triple-layer structure of titanium film-aluminum film-titanium film, or a triple-layer structure of molybdenum film-aluminum film-molybdenum film can be used. Note that the gate metal film is not limited to a triple-layer structure, but may have a single layer or a dual-layer structure, or a four or more-layered structure. Here, a layered film having a lower layer of a Ti film (thickness of 15 nm or more and 70 nm or less) and an upper layer of a Cu film (thickness of 200 nm or more and 400 nm or less) is formed as the gate metal film by sputtering.

STEP 4: Lower Resistance of Oxide Semiconductor Film 12'.

Figure 7A:
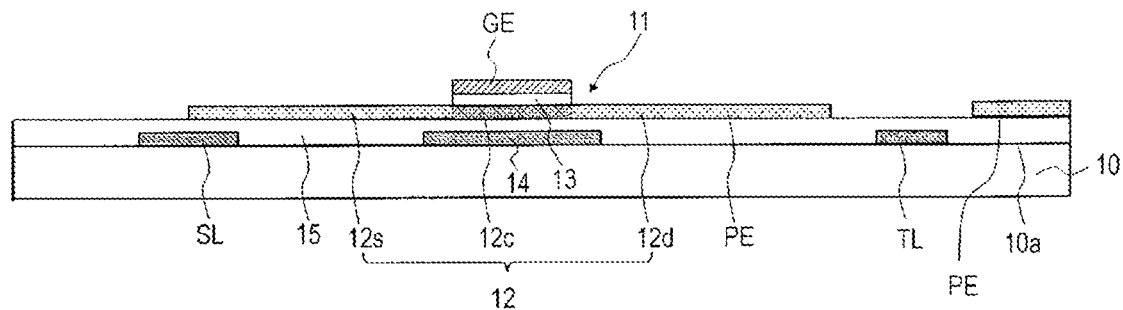
FIG. 7A is a process cross-sectional view illustrating an example of the manufacturing method of the active matrix substrate 101.

As illustrated in FIG. 7A, the resistance of a portion of the oxide semiconductor film 12' is lowered (or the portion is made conductive) to obtain the first low-resistive region 12s, the second low-resistive region 12d, and the pixel electrode PE. Here, plasma treatment is performed as a low-resistance treatment. This lowers a specific resistance of a region of the oxide semiconductor film 12' that does not overlap the gate electrode GE or the gate insulating layer 13 when viewed from the normal direction of the substrate plane, compared to a specific resistance of a region overlapping the gate electrode GE and the gate insulating layer 13 (channel region 12c) (for example, a sheet resistance is 200Ω/☐ or less).

In the plasma treatment, a portion of the oxide semiconductor film 12' that is not covered by the gate electrode GE is exposed to a reductive plasma or a plasma containing a doping element (for example, argon plasma). This lowers the specific resistance near a surface of the exposed portion of the oxide semiconductor film 12'. Note that a Method and conditions of the low-resistance treatment are described in JP 2008-40343 A, for example. The entire contents of the disclosure of JP 2008-40343 A are incorporated herein by reference.

STEP 5: Form Interlayer Insulating Layer 16 and Source Contact Hole CH1.

Figure 7B:
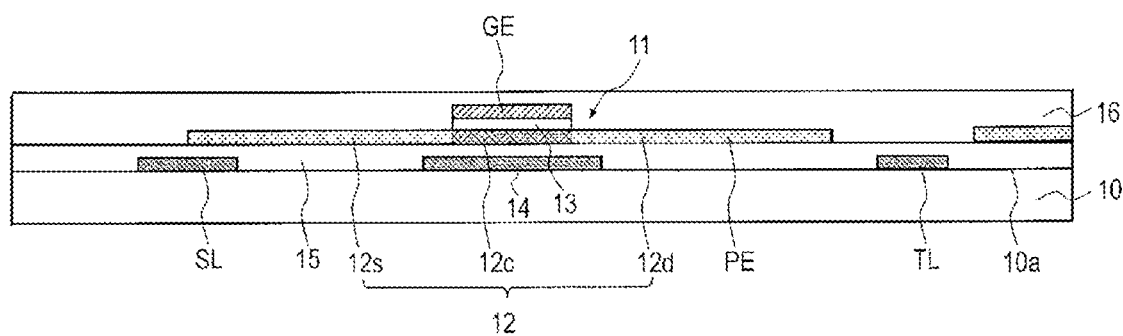
FIG. 7B is a process cross-sectional view illustrating an example of the manufacturing method of the active matrix substrate 101.

As illustrated in FIG. 7B, the interlayer insulating layer 16 (a third insulating film) 16 is deposited and formed to cover the oxide semiconductor layer 12, the gate electrode GE, and the gate wiring line GL. The interlayer insulating layer 16 can be formed as a single layer of or by layering an inorganic insulating layer such as a silicon oxide film, a silicon nitride film, a silicon oxynitride film, and a silicon nitride oxide film. A thickness of the inorganic insulating layer is 100 nm or more and 700 nm or less, for example. It is preferable to form the interlayer insulating layer 16 using an insulating film that reduces an oxide semiconductor such as a silicon nitride film, because a specific resistance of a region in contact with the interlayer insulating layer 16 (the first low-resistive region 12s, the second low-resistive region 12d, and the pixel electrode PE) can be maintained to be low. Here, a SiNx layer (thickness of 500 nm) is formed as the interlayer insulating layer 16 by CVD.

Figure 7C:
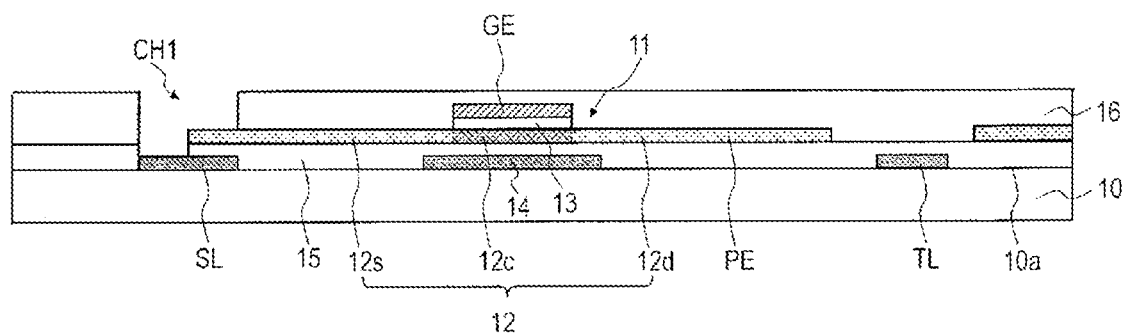
FIG. 7C is a process cross-sectional view illustrating an example of the manufacturing method of the active matrix substrate 101.

After that, as illustrated in FIG. 7C, the source contact hole CH1 and the touch contact hole CH2 are formed in the interlayer insulating layer 16 and the lower insulating layer 15, the source contact hole CH1 exposing a portion of the first low-resistive region 12s of the oxide semiconductor layer 12, the touch contact hole CH2 (not illustrated) exposing a portion of any of the touch wiring lines TL (see FIG. 3A and FIG. 3C). Forming of these contact holes CH1 and CH2 is performed by sequentially performing a photolithography process (patterning of a resist), etching of the interlayer insulating layer 16, etching of the lower insulating layer 15, and peeling of the resist.

STEP 6: Form Common Electrode CE and Connection Electrode 17.

Figure 7D:
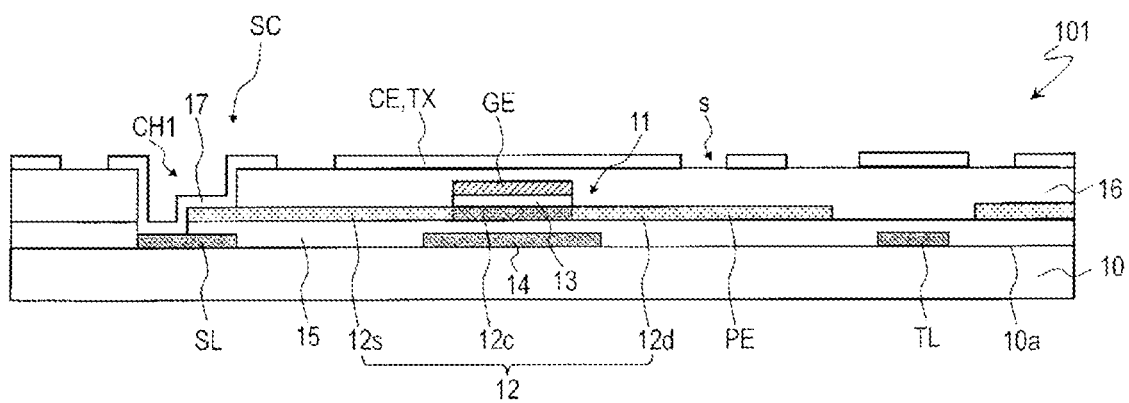
FIG. 7D is a process cross-sectional view illustrating an example of the manufacturing method of the active matrix substrate 101.

As illustrated in FIG. 7D, a transparent conductive film is deposited on the interlayer insulating layer 16, and then, the transparent conductive film is patterned to form the connection electrode 17 and the common electrode CE. The connection electrode 17 connects any one of the plurality of source wiring lines SL to the first low-resistive region 12s of the oxide semiconductor layer 12 within the corresponding source contact hole CH1. The common electrode CE is divided into a plurality of segments serving as the touch sensor electrodes TX, and each segment is connected to the touch wiring line within the corresponding touch contact hole CH2 (not illustrated). Patterning of the transparent conductive film is performed by sequentially performing a photolithography process (patterning of a resist), etching of the transparent conductive film, and stripping of the resist. Examples of a material of the transparent conductive film may include metal oxide such as ITO (indium-tin oxide), indium-zinc oxide, or ZnO. Here, an indium-zinc oxide film having a thickness of 20 nm or more and 300 nm or less is formed as the transparent conductive film by sputtering.

After that, an alignment film is formed to cover the common electrode CE and the interlayer insulating layer 16. In this manner, the active matrix substrate 101 is manufactured.

The active matrix substrate 101 according to the present embodiment, which has the configuration described above, can reduce the manufacturing processes to reduce the manufacturing costs. Hereinafter, the reason for the above is described in comparison to an active matrix substrate 901 in a comparative example illustrated in FIGS. 8A and 8B.

Active Matrix Substrate 901 in Comparative Example

Figure 8A:
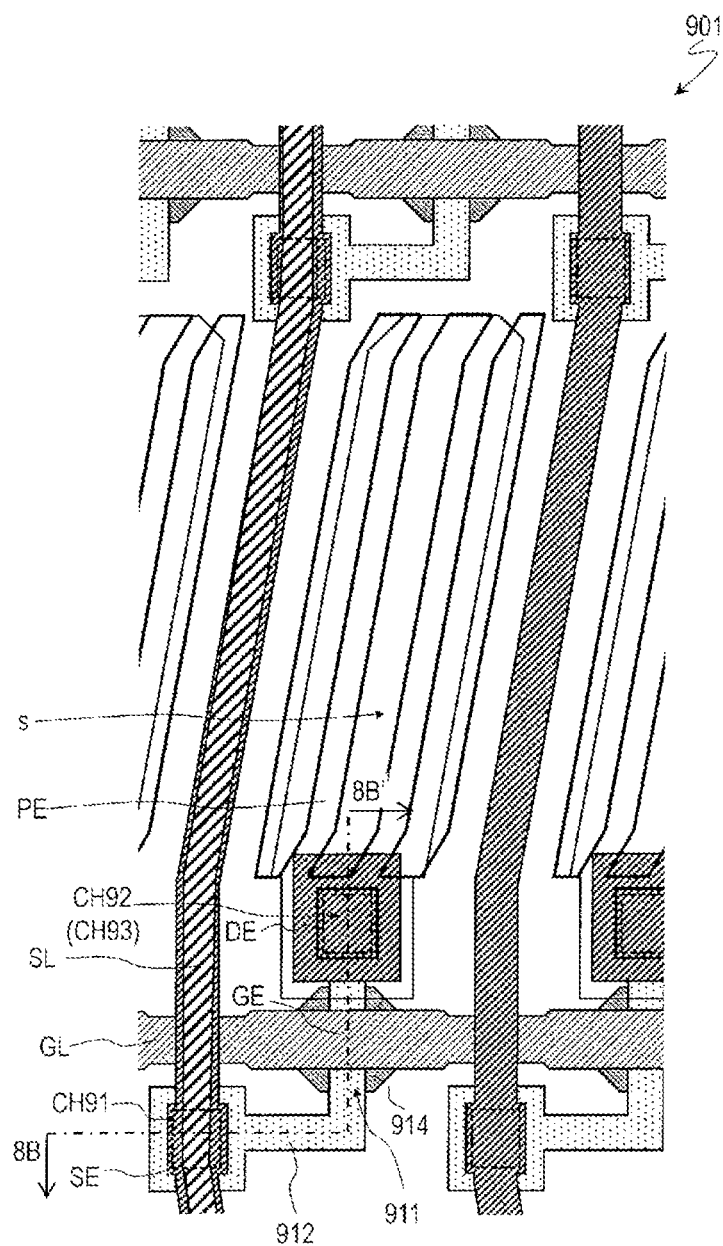
FIG. 8A is a plan view illustrating an active matrix substrate 901 in a comparative example.
Figure 8B:
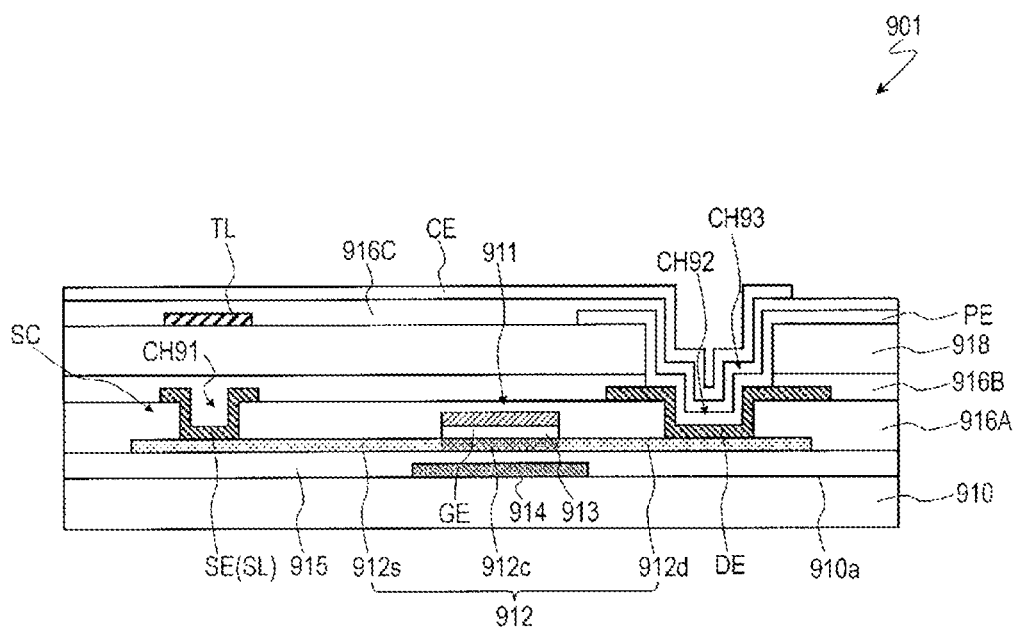
FIG. 8B is a cross-sectional view of the active matrix substrate 901 in the comparative example, illustrating a cross section taken along a line 8B-8B' in FIG. 8A.

FIG. 8A is a plan view illustrating the active matrix substrate 901 in the comparative example. FIG. 8B is a cross-sectional view of the active matrix substrate 901 in the comparative example, illustrating a cross section taken along a line 8B-8B' in FIG. 8A. The active matrix substrate 901 is used for an in-cell touch panel liquid crystal display device that displays in single scan driving.

The active matrix substrate 901 includes a substrate 910 having a main surface 910a, pixel TFTs 911 each provided corresponding to each of a plurality of pixels, a plurality of gate wiring lines GL extending in the row direction, a plurality of source wiring lines SL extending in the column direction, and a plurality of touch wiring lines TL extending in the column direction, as illustrated in FIGS. 8A and 8B. Furthermore, the active matrix substrate 901 includes a plurality of light blocking layers 914, a lower insulating layer 915, a first interlayer insulating layer 916A, a second interlayer insulating layer 916B, an organic insulating layer 918, pixel electrodes PE, a third interlayer insulating layer 916C, and a common electrode CE.

The plurality of light blocking layers 914 are provided on the main surface 910a of the substrate 910. Each of the plurality of light blocking layers 914 is disposed corresponding to each of the pixel TFTs 911. The lower insulating layer 915 is provided to cover the plurality of light blocking layers 914.

The pixel TFT 911 includes an oxide semiconductor layer 912 provided on the lower insulating layer 915, a gate insulating layer 913 provided on the oxide semiconductor layer 912, and a gate electrode GE provided to face the oxide semiconductor layer 912 with the gate insulating layer 913 interposed therebetween. The pixel TFT 911 further includes a source electrode SE electrically connected to the source wiring line SL, and a drain electrode DE electrically connected to the pixel electrode PE.

The oxide semiconductor layer 912 includes a channel region 912c, and a source region 912s and a drain region 912d that are positioned respectively on both sides of the channel region 912c. The channel region 912c overlaps the gate electrode GE when viewed from a normal direction of the main surface 910a of the substrate 910 (the normal direction of the substrate plane). The light blocking layer 914 disposed corresponding to each pixel overlaps at least the channel region 912c when viewed from the normal direction of the substrate surface.

The plurality of gate wiring lines GL are formed from the conductive film (gate metal film) the same as the gate electrode GE. To be more specific, the gate electrode GE is integrally formed with any one of the plurality of gate wiring lines GL, and a portion of each gate wiring line GL overlapping the oxide semiconductor layer 912 functions as the gate electrode GE.

The first interlayer insulating layer 916A is provided to cover the oxide semiconductor layer 912, the gate electrode GE, and the gate wiring line GL. The plurality of source wiring lines SL are provided on the first interlayer insulating layer 916A.

The source electrode SE is electrically connected to the source region 912s of the oxide semiconductor layer 912. More specifically, the source electrode SE is connected to the source region 912s within a source contact hole CH91 formed in the first interlayer insulating layer 916A. The source electrode SE is integrally formed with any one of the plurality of source wiring lines SL, and a portion of each source wiring line SL overlapping the oxide semiconductor layer 912 functions as the source electrode SE.

The drain electrode DE is electrically connected to the drain region 912d of the oxide semiconductor layer 912. More specifically, the drain electrode DE is connected to the drain region 912d within a drain contact hole CH92 formed in the first interlayer insulating layer 916A.

The second interlayer insulating layer 916B is formed to cover the pixel TFT 911. The organic insulating layer 918 is formed on the second interlayer insulating layer 916B.

The pixel electrode PE is provided on the organic insulating layer 918. The pixel electrode PE is formed of a transparent conductive material (e.g., ITO or IZO). The pixel electrode PE is electrically connected to the drain electrode DE of the pixel TFT 911. More specifically, the pixel electrode PE is connected to the drain electrode DE within a pixel contact hole CH93 formed in the organic insulating layer 918 and the second interlayer insulating layer 916B.

The plurality of touch wiring lines TL are formed in a layer separate from those for the source wiring lines SL and the gate wiring lines GL. In this example, the touch wiring line TL is disposed on the organic insulating layer 918. The touch wiring line TL may extend in the column direction to overlap any one of the source wiring lines SL when viewed from the normal direction of the substrate plane. Such an arrangement can ensure the pixel aperture ratio. Note that the touch wiring line TL may be disposed on the third interlayer insulating layer 916C, or on the common electrode CE with another insulating layer interposed therebetween.

The third interlayer insulating layer 916C is provided to cover the pixel electrode PE.

The common electrode CE is provided on the third interlayer insulating layer 916C. The common electrode CE is formed of a transparent conductive material (e.g., ITO or IZO). At least one slit s is formed in the common electrode CE per pixel.

The common electrode CE is divided into a plurality of segments each of which functions as the touch sensor electrode TX. Each touch sensor electrode TX is electrically connected to the corresponding touch wiring line TL. In this example, the touch sensor electrode TX is in contact with the touch wiring line TL within a touch contact hole (not illustrated) formed in the third interlayer insulating layer 916C.

Next, a manufacturing method of the active matrix substrate 901 will be described with reference to FIG. 9, FIGS. 10A to 10D, FIGS. 11A to 11D, FIGS. 12A to 12C, and FIGS. 13A to 13C. FIG. 9 is a flowchart illustrating the manufacturing method of the active matrix substrate 901. Each of FIGS. 10A to 10D, FIGS. 11A to 11D, FIGS. 12A to 12C, and FIGS. 13A to 13C is a process cross-sectional view illustrating the manufacturing method of the active matrix substrate 901.

STEP 1: Form Light Blocking Layer 914.

Figure 10A:
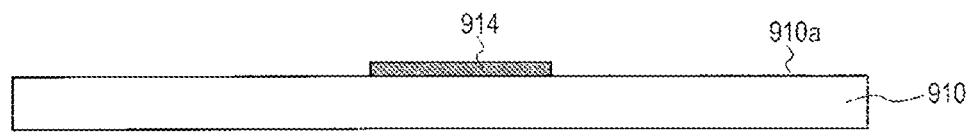
FIG. 10A is a process cross-sectional view illustrating an example of the manufacturing method of the active matrix substrate 901 in the comparative example.

As illustrated in FIG. 10A, the light blocking layer 914 is formed on the main surface 910a of the substrate 910. Specifically, first, a light blocking layer film is deposited on the main surface 910a of the substrate 910 by sputtering, and then, the light blocking film is pattered such that the light blocking layer 914 can be formed. Patterning of the light blocking film is performed by sequentially performing a photolithography process (patterning of a resist), etching of the light blocking film, and peeling of the resist.

STEP 2: Form Lower Insulating Layer 915 and Oxide Semiconductor Film 912'.

Figure 10B:
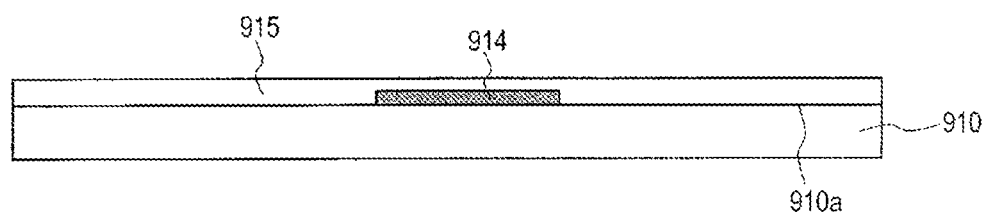
FIG. 10B is a process cross-sectional view illustrating an example of the manufacturing method of the active matrix substrate 901 in the comparative example.

As illustrated in FIG. 10B, a first insulating film is deposited to cover the light blocking layer 914 to form the lower insulating layer 915.

Figure 10C:
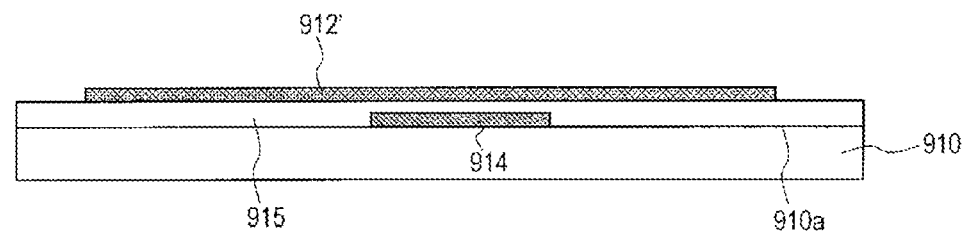
FIG. 10C is a process cross-sectional view illustrating an example of the manufacturing method of the active matrix substrate 901 in the comparative example.

Next, as illustrated in FIG. 10C, an oxide semiconductor film 912' is deposited on the lower insulating layer 915, and then, the oxide semiconductor film 912' is patterned. Patterning of the oxide semiconductor film 912' is performed by sequentially performing a photolithography process (patterning of a resist), etching of the oxide semiconductor film 912', and peeling of the resist.

STEP 3: Form Gate Insulating Layer 913, Gate Electrode GE, and Gate Wiring Line GL.

Figure 10D:
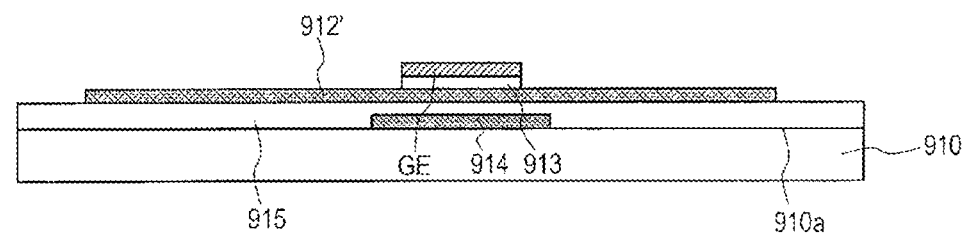
FIG. 10D is a process cross-sectional view illustrating an example of the manufacturing method of the active matrix substrate 901 in the comparative example.

As illustrated in FIG. 10D, a second insulating film and a gate metal film are deposited in this order to cover the oxide semiconductor film 912', and then, the gate metal film and the second insulating film are pattered to form the gate insulating layer 913, the gate electrode GE, and the gate wiring line GL. Patterning of the gate metal film and the second insulating film is performed by sequentially performing a photolithography process (patterning of a resist), etching of the gate metal film, etching of the second insulating film, and peeling of the resist.

STEP 4: Lower Resistance of Oxide Semiconductor Film 912'.

Figure 11A:
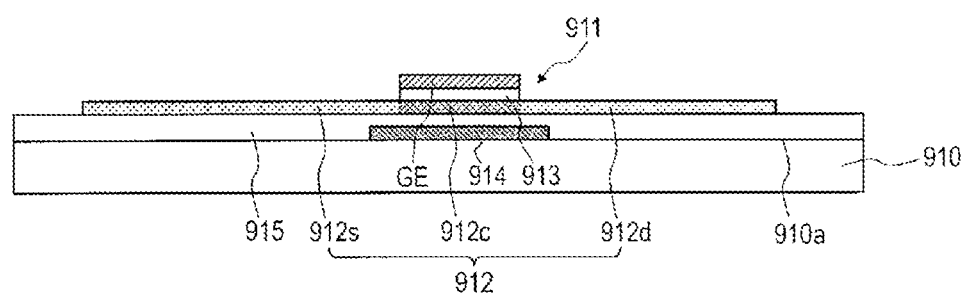
FIG. 11A is a process cross-sectional view illustrating an example of the manufacturing method of the active matrix substrate 901 in the comparative example.

As illustrated in FIG. 11A, the resistance of a portion of the oxide semiconductor film 912' is lowered (or the portion is made conductive) by the plasma treatment to obtain the source region 912s and the drain region 912d.

STEP 5: Form First Interlayer Insulating Layer 916A, Source Contact Hole CH91, and Drain Contact Hole CH92.

Figure 11B:
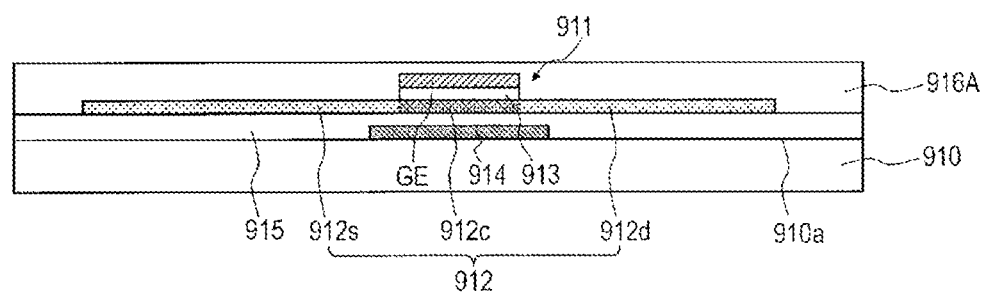
FIG. 11B is a process cross-sectional view illustrating an example of the manufacturing method of the active matrix substrate 901 in the comparative example.

As illustrated in FIG. 11B, the first interlayer insulating layer (a third insulating film) 916A is deposited and formed to cover the oxide semiconductor layer 912, the gate electrode GE, and the gate wiring line GL.

Figure 11C:
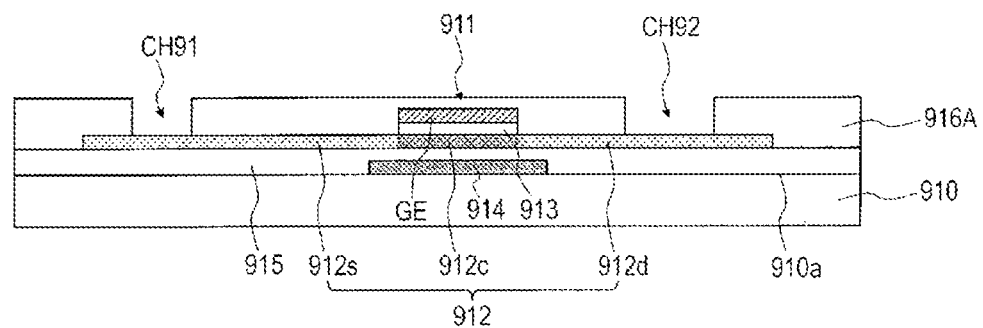
FIG. 11C is a process cross-sectional view illustrating an example of the manufacturing method of the active matrix substrate 901 in the comparative example.

After that, as illustrated in FIG. 11C, the source contact hole CH91 and the drain contact hole CH92 are formed in the first interlayer insulating layer 916A, the source contact hole CH91 exposing a portion of the source region 912s of the oxide semiconductor layer 912, the drain contact hole CH92 exposing a portion of the drain region 912d. Forming of the source contact hole CH91 and the drain contact hole CH92 is performed by sequentially performing a photolithography process (patterning of a resist), etching of the first interlayer insulating layer 916A, and peeling of the resist.

STEP 6: Form Source Electrode SE, Drain Electrode DE, and Source Wiring Line SL.

Figure 11D:
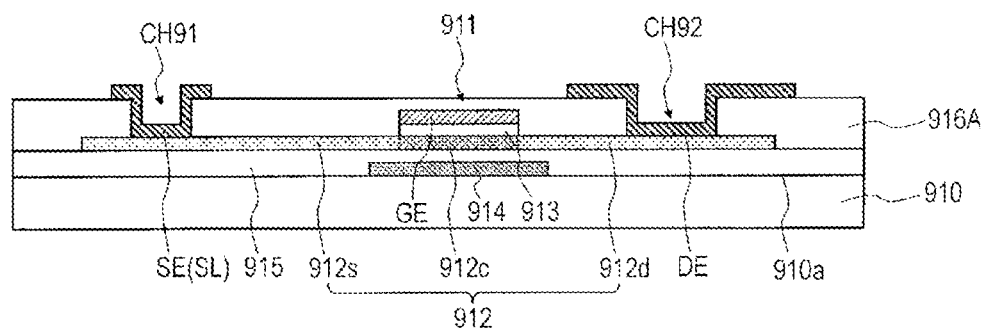
FIG. 11D is a process cross-sectional view illustrating an example of the manufacturing method of the active matrix substrate 901 in the comparative example.

As illustrated in FIG. 11D, a source metal film is deposited on the first interlayer insulating layer 916A, and then, the source metal film is patterned to form the source electrode SE, the drain electrode DE, and the source wiring line SL. Patterning of the source metal film is performed by sequentially performing a photolithography process (patterning of a resist), etching of the source metal film, and peeling of the resist.

STEP 7: Form Second Interlayer Insulating Layer 916B, Organic Insulating Layer 918, and Pixel Contact Hole CH93.

Figure 12A:
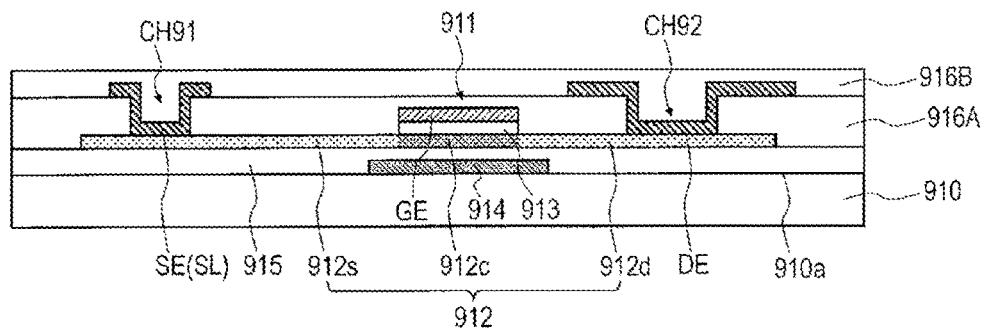
FIG. 12A is a process cross-sectional view illustrating an example of the manufacturing method of the active matrix substrate 901 in the comparative example.

As illustrated in FIG. 12A, the second interlayer insulating layer (a fourth insulating film) 916B is deposited and formed to cover the pixel TFT 911.

Figure 12B:
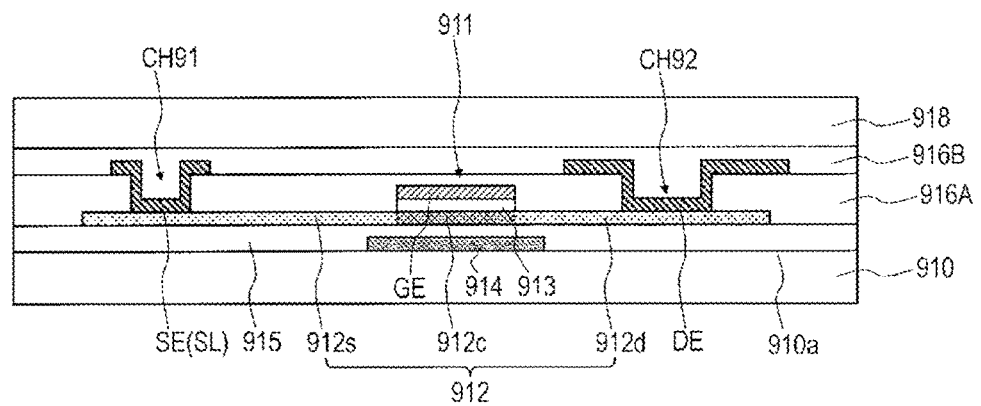
FIG. 12B is a process cross-sectional view illustrating an example of the manufacturing method of the active matrix substrate 901 in the comparative example.

Next, as illustrated in FIG. 12B, the organic insulating layer (a fifth insulating film) 918 is deposited (applied) and formed on the second interlayer insulating layer 916B.

Figure 12C:
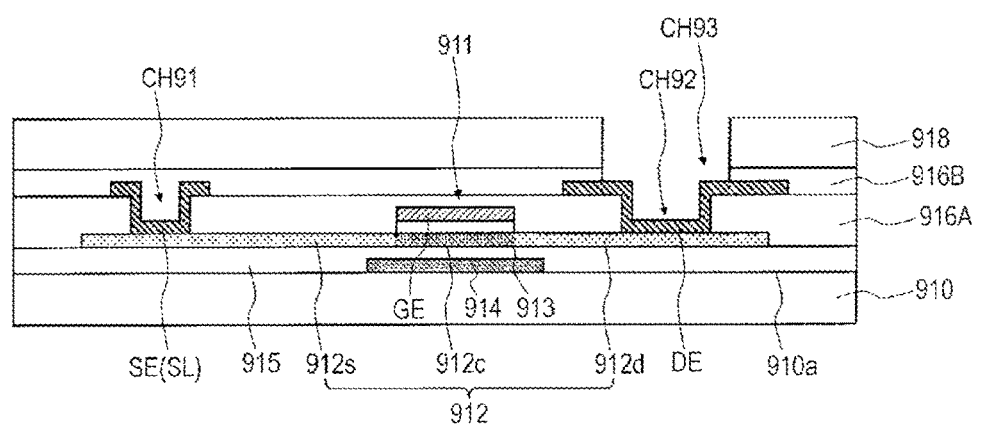
FIG. 12C is a process cross-sectional view illustrating an example of the manufacturing method of the active matrix substrate 901 in the comparative example.

After that, as illustrated in FIG. 12C, the pixel contact hole CH93 is formed in the organic insulating layer 918 and the second interlayer insulating layer 916B to expose a portion of the drain electrode DE. Forming of the pixel contact hole CH93 is performed by sequentially performing patterning of the organic insulating layer 918 using a halftone mask, ashing of the organic insulating layer 918, etching of the second interlayer insulating layer 916B, and peeling of the resist. In the example illustrated in FIG. 8, the lower insulating layer 915 is etched between the etching of the second interlayer insulating layer 916B and the peeling of the resist.

STEP 8: Form Pixel Electrode PE.

Figure 13A:
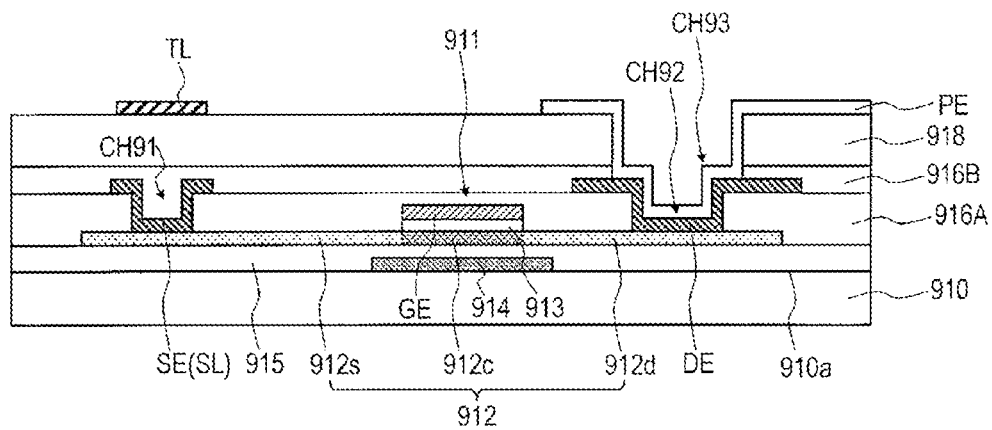
FIG. 13A is a process cross-sectional view illustrating an example of the manufacturing method of the active matrix substrate 901 in the comparative example.

As illustrated in FIG. 13A, a first transparent conductive film is deposited on the organic insulating layer 918, and then, the first transparent conductive film is patterned to form the pixel electrode PE. Patterning of the first transparent conductive film is performed by sequentially performing a photolithography process (patterning of a resist), etching of the first transparent conductive film, and peeling of the resist.

STEP 9: Form Touch Wiring Line TL.

Next, as illustrated in FIG. 13A, a metal film for the touch wiring line is deposited on the organic insulating layer 918, and then, the metal film for the touch wiring line is patterned to form the touch wiring line TL. Patterning of the metal film for the touch wiring line is performed by sequentially performing a photolithography process (patterning of a resist), etching of the metal film for the touch wiring line, and peeling of the resist.

STEP 10: Form Third Interlayer Insulating Layer 916C.

Figure 13B:
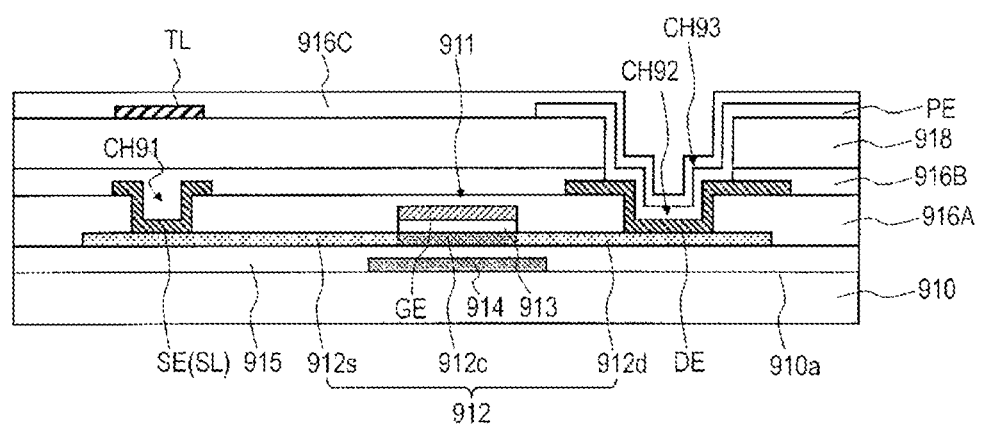
FIG. 13B is a process cross-sectional view illustrating an example of the manufacturing method of the active matrix substrate 901 in the comparative example.

As illustrated in FIG. 13B, the third interlayer insulating layer (a sixth insulating film) 916C is deposited to cover the pixel electrode PE, and then, the third interlayer insulating layer 916C is patterned. As a result, a touch contact hole (not illustrated) is formed in the third interlayer insulating layer 916C. Patterning of the third interlayer insulating layer 916C is performed by sequentially performing a photolithography process (patterning of a resist), etching of the third interlayer insulating layer 916C, and peeling of the resist.

STEP 11: Form Common Electrode CE.

Figure 13C:
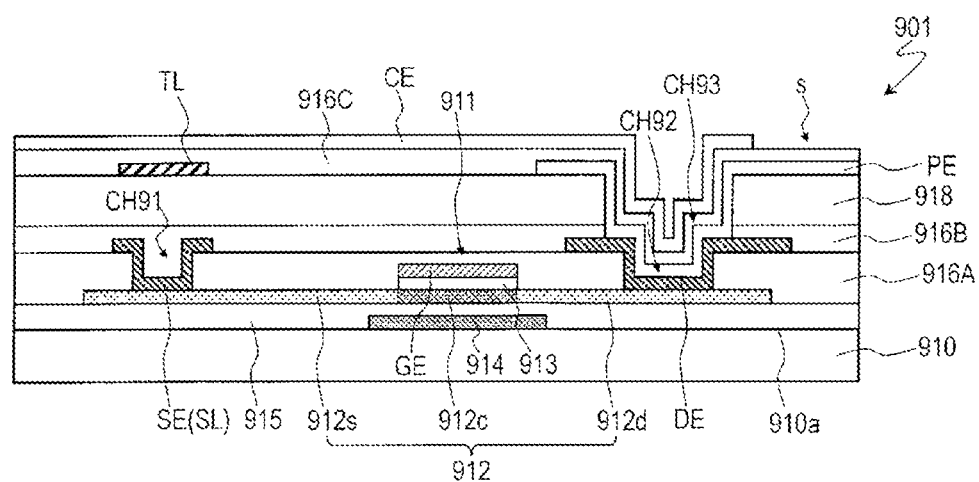
FIG. 13C is a process cross-sectional view illustrating an example of the manufacturing method of the active matrix substrate 901 in the comparative example.

As illustrated in FIG. 13C, a second transparent conductive film is deposited on the third interlayer insulating layer 916C, and then, the second transparent conductive film is patterned to form the common electrode CE. The common electrode CE is divided into a plurality of segments each of which functions as the touch sensor electrode TX. Patterning of the second transparent conductive film is performed by sequentially performing a photolithography process (patterning of a resist), etching of the second transparent conductive film, and peeling of the resist.

After that, an alignment film is formed to cover the common electrode CE. In this manner, the active matrix substrate 901 is manufactured.

In this manner, in the comparative example, the manufacturing processes for the active matrix substrate 901 are many, and thus, the manufacturing costs are increased. This comes from that, for adopting of the FFS mode, two layers of transparent electrodes (the pixel electrode PE and the common electrode CE) are needed which are disposed one above the other with the insulating layer (the third interlayer insulating layer 916C) interposed therebetween, and the oxide semiconductor TFT 911 having the top gate structure needs the multilayer structure of the light blocking layer 914, the oxide semiconductor layer 912, the gate wiring line GL, the source wiring line SL, and the like. The multilayer structure causes the complex planar design to make it difficult to obtain a high aperture ratio.

Furthermore, in the comparative example, the manufacturing processes further increase as the touch wiring line TL is formed. The touch wiring lines TL are typically formed above the organic insulating layer 918 and in a layer separate from those for the source wiring lines SL and the gate wiring lines GL. Therefore, it is necessary to further add a step of forming the metal film for the touch wiring line and patterning. Although not illustrated, a further interlayer insulating layer may be formed to separate the touch wiring line TL from the pixel electrode PE or the common electrode CE. A patterning step for forming the touch contact hole of the touch wiring line contact portion may be performed additionally.

In contrast, the active matrix substrate 101 according to the present embodiment has the following configurations [A] to [D].

[A] The plurality of source wiring lines SL and the plurality of touch wiring lines TL are located between the main surface 10a of the substrate 10 and the lower insulating layer 15, and are formed from the conductive film the same as the plurality of light blocking layers 14 (formed in the layer the same as the light blocking layers 14).

[B] The pixel electrode PE is formed from the oxide film the same as the oxide semiconductor layer 12, and is continuous with the second low-resistive region 12d in the oxide semiconductor layer 12.

[C] A pair of gate wiring lines GL1 and GL2 is connected to one pixel row px, and one source wiring line SL is connected to a pair of pixel columns. A pair of pixel columns includes the first pixel column py1 and the second pixel column py2 adjacent to the first pixel column py1.

[D] Each of the plurality of source wiring lines SL is disposed between the first pixel column py1 and the second pixel column py2 in the corresponding pair of pixel columns when viewed from the normal direction of the substrate surface. Each of the plurality of touch wiring lines TL is disposed between two adjacent pixel columns between two adjacent source wiring lines of the plurality of source wiring lines SL.

As can be seen from the description with referred to FIG. 5, the active matrix substrate 101 can reduce the manufacturing processes to reduce the manufacturing costs. For example, in manufacturing the active matrix substrate 901 of the comparative example, 10 photomasks are required, whereas in the example illustrated in FIG. 5, the number of required photomasks can be reduced to five. In this way, the number of photomasks can be significantly reduced, so the manufacturing costs can be reduced. The yield can be increased because of the smaller number of layers (that is, the short manufacturing flow), which also allows the manufacturing costs to be reduced.

Specifically, according to the present embodiment, forming the touch wiring lines TL and the source wiring lines SL in the same layer (source metal layer) (configuration [A]) eliminates the need to newly add the metal layer for the touch wiring line. Note that in the comparative example, in order to ensure the aperture ratio, both the touch wiring line TL and the source wiring line SL need to be disposed between one set of pixel columns, and therefore, these wiring lines cannot be formed in the same layer. In contrast, in the present embodiment, the configuration [C] and the configuration [D] allow the touch wiring line TL and the source wiring line SL to be formed in the same layer (source metal layer) without reducing the aperture ratio.

The configuration [B] allows the transparent conductive layer for the pixel electrode to be reduced compared to the comparative example.

The active matrix substrate 101 includes the connection electrode 17 formed from the transparent conductive film the same as the common electrode CE, and the connection electrode 17 may connect any one of the plurality of source wiring lines SL to the first low-resistive region 12s of the oxide semiconductor layer 12 within the source contact hole CH1 formed in the interlayer insulating layer 16 and the lower insulating layer 15. This allows the touch contact hole CH2 for connecting the touch wiring line TL to the touch sensor electrode TX (common electrode CE) to be formed in the patterning process common to the source contact hole CH1. Accordingly, the increase in the number of manufacturing processes caused by forming the touch wiring line contact portion TC can be further suppressed.

In the comparative example (single scan drive), the number of source wiring lines SL is the same number as the number M of pixel columns, but in the present embodiment, the double gate drive is employed (configuration [C]), so the number of source wiring lines SL is M/2. Therefore, the number of source drivers mounted on the semiconductor chip 30 can be reduced to ½ compared to the comparative example. Accordingly, the manufacturing costs can be further reduced.

Figure 14:
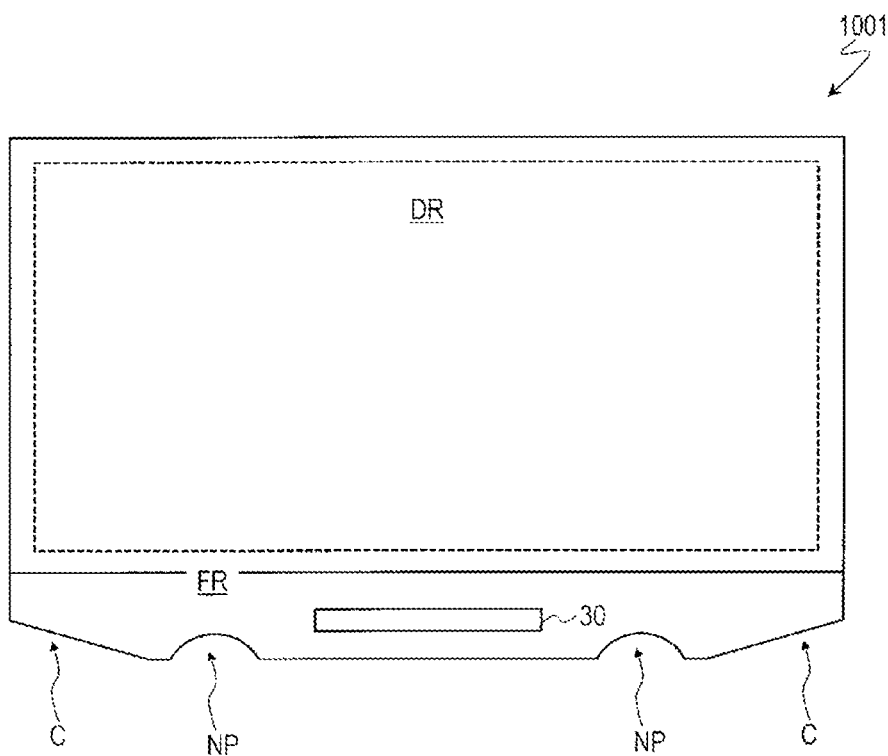
FIG. 14 is a diagram illustrating a configuration of the liquid crystal display device 1001 in which a notch NP and a corner cut C are provided in a peripheral region FR.

As a result of reducing the number of mounted source drivers, an area occupied by the semiconductor chip 30 in the peripheral region FR can be reduced, so the degree of freedom of an outline of the panel increases. For example, as illustrated in FIG. 14, notches NP and corner cuts C are easy to provide in the peripheral region FR (that is, the peripheral region FR is easy to partially cut out). Note that the number and shape of notches NP and corner cuts C are not limited to those illustrated here.

Note that in the present embodiment, the number of the gate wiring lines GL is twice, so a time taken to write to the pixels is approximately ½. However, since the pixel TFT 11 has the top gate structure with high current supply performance, writing to pixels may be suitably performed in a relatively short time.

Furthermore, according to the present embodiment, the aperture ratio can be increased compared to the comparative example.

Since the configuration [B] eliminates the need for the drain electrode and the pixel contact hole of the pixel TFT 11 (the contact hole connecting the drain electrode and the pixel electrode of the pixel TFT), a proportion of an area occupied by the layer having the light blocking properties in the pixel (referred to as a "metal occupancy ratio") is reduced. As an example, the metal occupancy ratio is calculated for pixels with a pitch of 25 μm in the row direction and a pitch of 75 μm in the column direction, in cases that the drain electrode and the pixel contact hole is formed and not formed. As a result, it is confirmed that the metal occupancy rate can be decreased by about 5% by not forming the drain electrode and the pixel contact hole. Therefore, according to the present embodiment, the metal occupancy ratio can be reduced, so the aperture ratio can be improved.

Since the configuration [D] allows both the touch wiring line TL and the source wiring line SL to be disposed between the pixel columns, it is possible to suppress a reduction in the aperture ratio caused by these wiring lines.

Furthermore, in the active matrix substrate 101 according to the present embodiment, when viewed from the normal direction of the substrate plane, the oxide semiconductor layer 12 overlaps approximately half of a region of the source wiring line SL located within the source contact hole CH1 (specifically, 40% or more and 60% or less of the region of the source wiring line SL located within the source contact hole CH1). As described above, the number of the source contact portions SC is ½ of the number of source contact portions SC in the active matrix substrate 901 of the comparative example. Accordingly, an area of the region (connecting portion) where the connection is made by the connection electrode 17 can be reduced to further improve the aperture ratio.

Figure 15A:
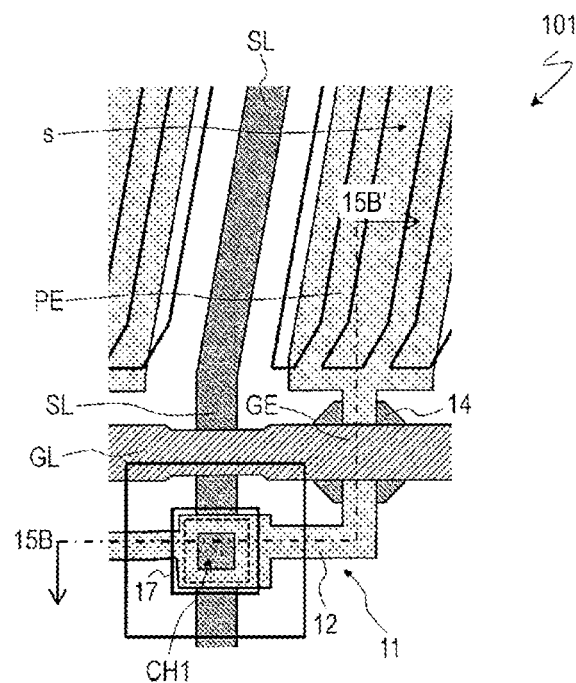
FIG. 15A is a plan view illustrating another example of a positional relationship between an oxide semiconductor layer 12 and a source wiring line SL within a source contact hole CH1.
Figure 15B:
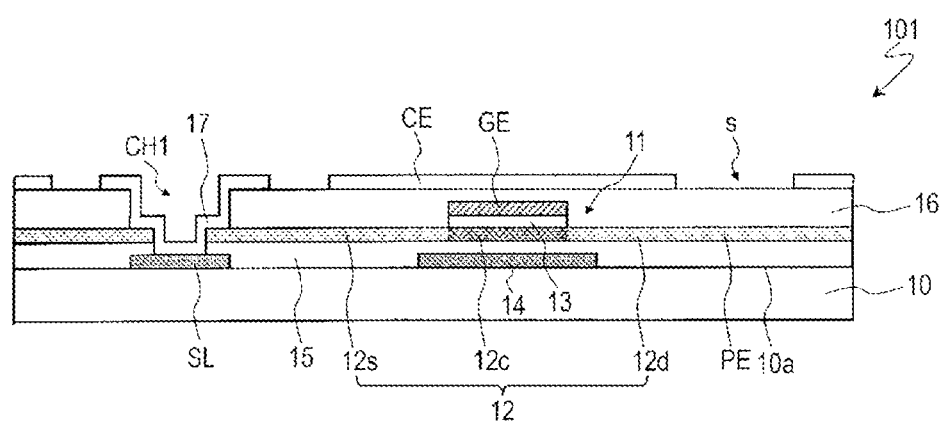
FIG. 15B is a cross-sectional view taken along a line 15B-15B' in FIG. 15A.

Note that although FIG. 3A illustrates the example in which the oxide semiconductor layer 12 overlaps a half of the source wiring line SL within the source contact hole CH1 and does not overlap the remaining half, the positional relationship between the oxide semiconductor layer 12 and the source wiring line SL within the source contact hole CH1 is not limited to this example. For example, the oxide semiconductor layer 12 may overlap the source wiring line SL within the source contact hole CH1 as illustrated in FIGS. 15A and 15B. In the example illustrated in FIGS. 15A and 15B, the oxide semiconductor layer 12 overlaps the source wiring line SL near the entire edge of the source contact hole CH1 and does not overlap the source wiring line SL near the center of the source contact hole CH1 when viewed from the normal direction of the substrate plane.

Second Embodiment

Figure 16A:
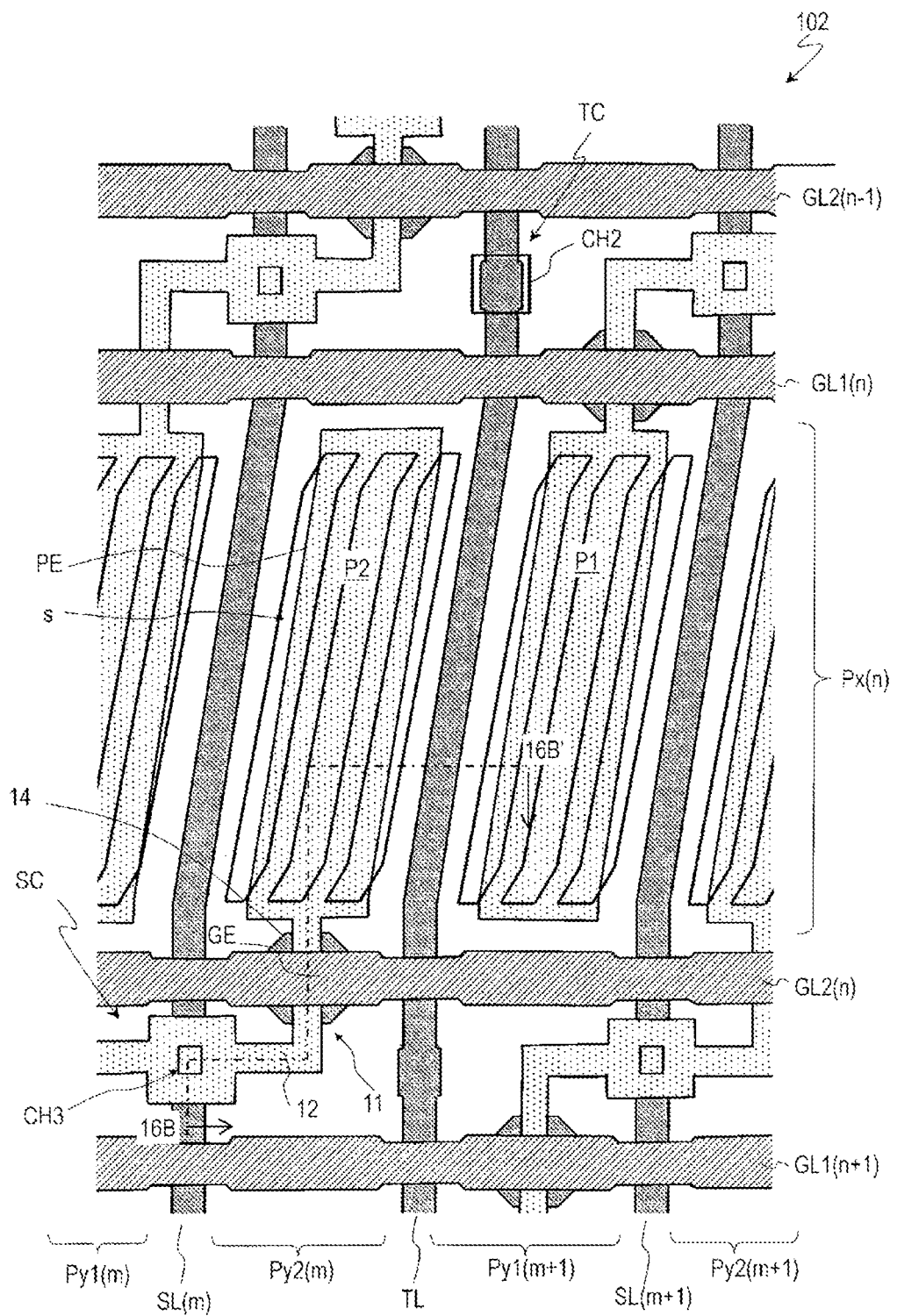
FIG. 16A is a plan view schematically illustrating an active matrix substrate 102 according to an embodiment of the present disclosure.
Figure 16B:
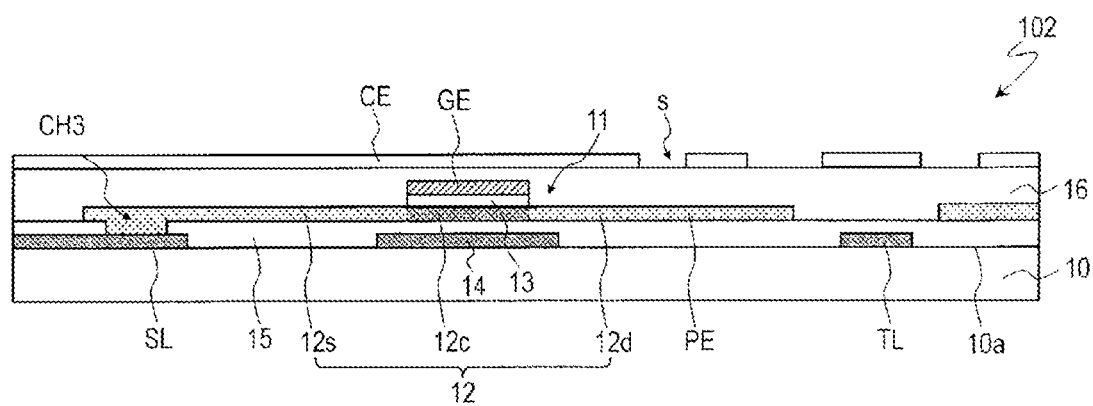
FIG. 16B is a cross-sectional view schematically illustrating the active matrix substrate 102, taken along a line 16B-16B' in FIG. 16A.

FIGS. 16A and 16B area plan view and a cross-sectional view, respectively, schematically illustrating an active matrix substrate 102 according to a second embodiment of the present disclosure. FIG. 16B illustrates a cross section taken along the line 16B-16B' in FIG. 16A.

The active matrix substrate 102 according to the present embodiment includes a source contact portion SC having a structure different from the active matrix substrate 101 according to the above-described embodiment. Other configurations may be similar to the configurations of the active matrix substrate 101.

In the active matrix substrate 102, a source contact hole CH3 is formed in the lower insulating layer 15 in the source contact portion SC. The oxide semiconductor layer 12 is disposed on the lower insulating layer 15 and within the source contact hole CH3 formed in the lower insulating layer 15. The first low-resistive region 12s of the oxide semiconductor layer 12 is electrically connected to the corresponding source wiring line SL within the source contact hole CH3. The oxide semiconductor layer 12 may directly contact the source wiring line SL.

In the embodiment described above, the first low-resistive region 12s of the oxide semiconductor layer 12 is electrically connected to the corresponding source wiring line SL via the connection electrode 17 that is formed using the transparent conductive film the same as the common electrode CE. A contact structure like this may be formed by a process common to the contact structure of the touch sensor electrode TX and the touch wiring line TL, which gives an advantage that the number of manufacturing processes can be further reduced. However, the connection electrode 17 and the common electrode CE are formed to be sufficiently spaced from each other so that no leakage occurs between the connection electrode 17 and the common electrode CE, and thus, the size of the common electrode CE may decrease to reduce the pixel aperture ratio (the area ratio of the portion contributing to displaying in each pixel area).

In contrast, in the present embodiment, the connection electrode is not formed, so the leak failure as described above does not occur. Accordingly, the reduction in the pixel aperture ratio may be suppressed compared to the above-described embodiment. However, since the lower insulating layer 15 needs to be patterned before forming the oxide semiconductor layer 12, the number of photolithography processes increases.

Figure 17:
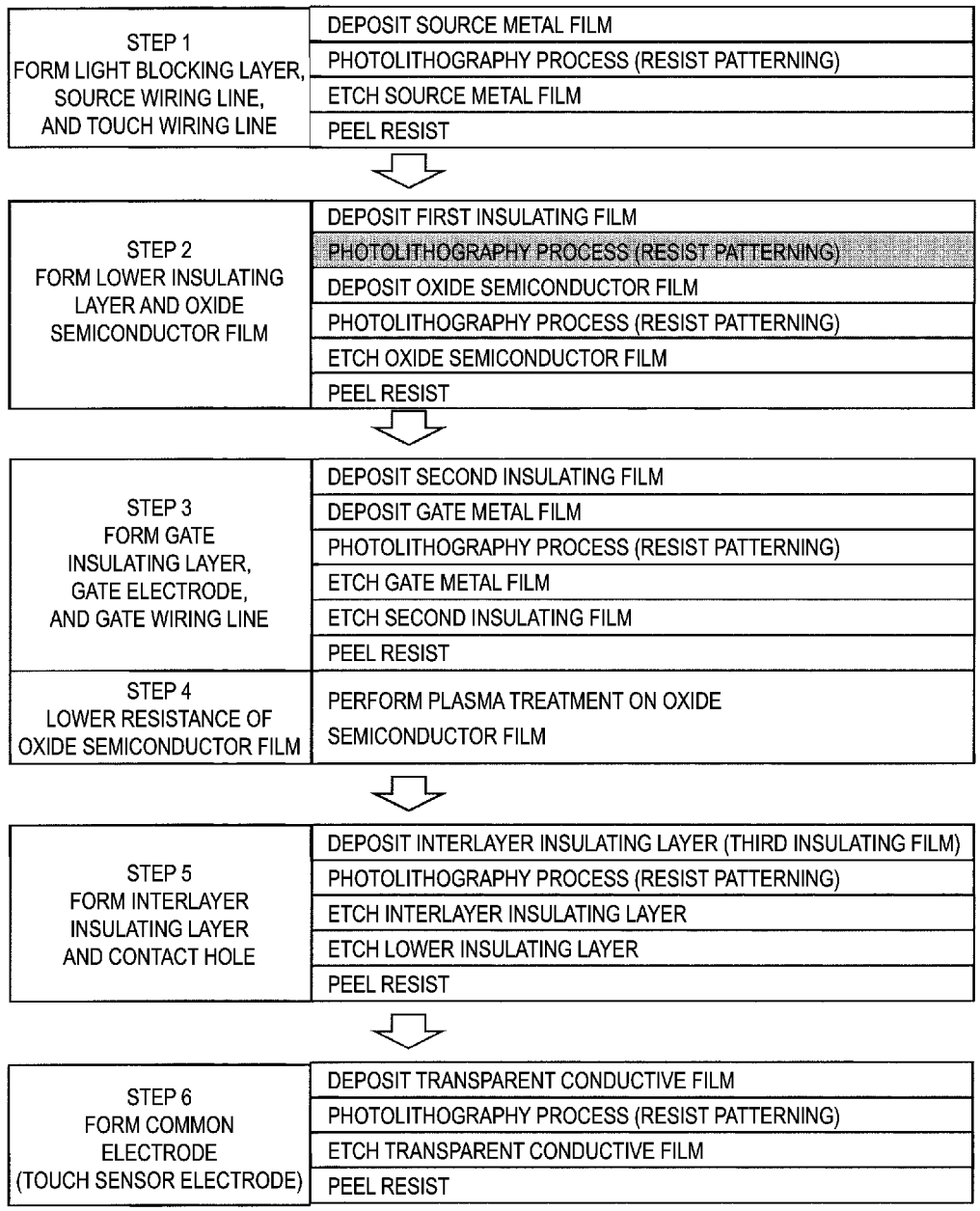
FIG. 17 is a flowchart illustrating an example of a manufacturing method of the active matrix substrate 102.
Figure 18A:
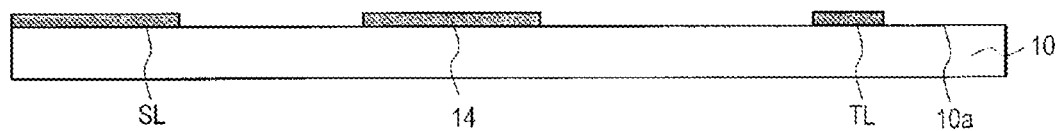
FIG. 18A is a process cross-sectional view illustrating an example of the manufacturing method of the active matrix substrate 102.
Figure 18B:
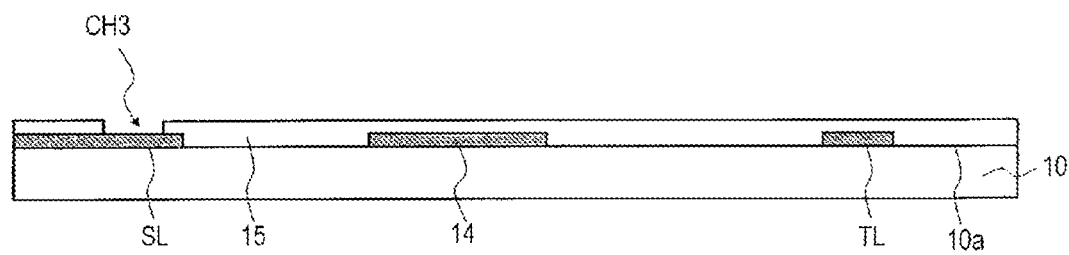
FIG. 18B is a process cross-sectional view illustrating an example of the manufacturing method of the active matrix substrate 102.
Figure 18C:
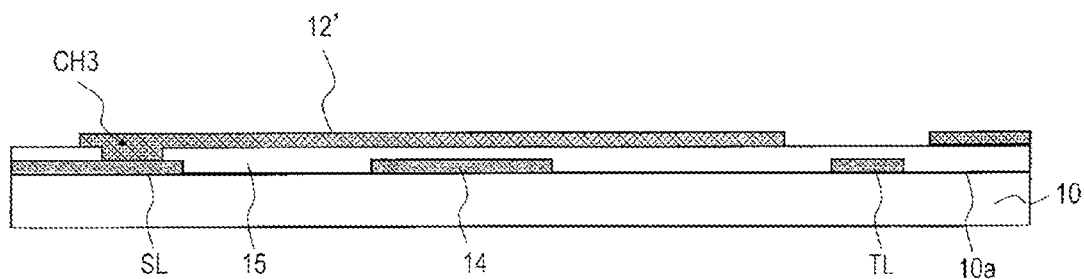
FIG. 18C is a process cross-sectional view illustrating an example of the manufacturing method of the active matrix substrate 102.

Next, a manufacturing method of the active matrix substrate 102 will be described with reference to FIG. 17, and FIGS. 18A to 18C. FIG. 17 is a flowchart illustrating an example of the manufacturing method of the active matrix substrate 102. Each of FIGS. 18A to 18C is a process cross-sectional view illustrating an example of the manufacturing method of the active matrix substrate 102. The following description mainly describes differences from the manufacturing method of the active matrix substrate 101. Since the material, the thickness, and the formation method of each layer are the same as those of the active matrix substrate 101, the description thereof is omitted.

First, in STEP 1, as illustrated in FIG. 18A, the light blocking layer 14, the source wiring line SL, and the touch wiring line TL are formed on the substrate 10.

Next, in STEP 2, as illustrated in FIG. 18B, the first insulating film is deposited to cover the light blocking layer 14, the source wiring line SL, and the touch wiring line TL, and then, the first insulating film is patterned to form the lower insulating layer 15. Patterning of the first insulating film is performed by sequentially performing a photolithography process (patterning of a resist), etching of the first insulating film, and stripping of the resist. By doing so, the source contact hole CH3 exposing a portion of the source wiring line SL is formed in the first insulating film.

Next, in STEP 3, as illustrated in FIG. 18C, the oxide semiconductor film 12' is deposited on the lower insulating layer 15 and within the source contact hole CH3, and then, the oxide semiconductor film 12' is patterned. The oxide semiconductor film 12' is electrically connected to the exposed portion of the source wiring line SL within the source contact hole CH3.

The subsequent processes (STEP 4 to STEP 6) are similar to the active matrix substrate 101. However, in the present embodiment, the source contact hole is not formed in the STEP 5 when forming the touch contact hole CH2 in the interlayer insulating layer 16 and the lower insulating layer 15. In STEP 6, the connection electrode is not formed when forming the common electrode CE (touch sensor electrode TX) by patterning the transparent conductive film. In this manner, the active matrix substrate 102 is manufactured.

Oxide Semiconductor

An oxide semiconductor included in the oxide semiconductor layer 12 may be an amorphous oxide semiconductor, or may be a crystalline oxide semiconductor including a crystalline portion. Examples of the crystalline oxide semiconductor include a polycrystalline oxide semiconductor, a microcrystalline oxide semiconductor, or a crystalline oxide semiconductor having a c-axis oriented substantially perpendicular to the layer surface.

The oxide semiconductor layer 12 may have a layered structure including two or more layers. In a case that the oxide semiconductor layer 12 includes a layered structure, the oxide semiconductor layer 12 may include an amorphous oxide semiconductor layer and a crystalline oxide semiconductor layer. Alternatively, the oxide semiconductor layer 12 may include a plurality of crystalline oxide semiconductor layers having different crystal structures. The oxide semiconductor layer 12 may include a plurality of amorphous oxide semiconductor layers. In a case that the oxide semiconductor layer 12 has a dual-layer structure including an upper layer and a lower layer, an energy gap of the oxide semiconductor included in the lower layer is preferably greater than an energy gap of the oxide semiconductor included in the upper layer. However, when the difference in energy gap between these layers is relatively small, the energy gap of the oxide semiconductor in the upper layer may be greater than the energy gap of the oxide semiconductor in the lower layer.

Materials, structures, and film formation methods of an amorphous oxide semiconductor and the above-described crystalline oxide semiconductors, a configuration of an oxide semiconductor layer including a layered structure, and the like are described in, for example, JP 2014-007399 A. The entire contents of the disclosure of JP 2014-007399 A are incorporated herein by reference.

The oxide semiconductor layer 12 may include, for example, at least one metal element selected from In, Ga, and Zn. In the present embodiment, the oxide semiconductor layer 12 includes, for example, an In—Ga—Zn—O based semiconductor (for example, an indium gallium zinc oxide). Here, the In—Ga—Zn—O based semiconductor is a ternary oxide of In (indium), Ga (gallium), and Zn (zinc), and a ratio (composition ratio) of In, Ga, and Zn is not particularly limited. For example, the ratio includes In:Ga:Zn=2:2:1, In:Ga:Zn=1:1:1, or In:Ga:Zn=1:1:2, or the like. Such an oxide semiconductor layer 12 can be formed of an oxide semiconductor film including the In—Ga—Zn—O based semiconductor.

The In—Ga—Zn—O based semiconductor may be an amorphous semiconductor or may be a crystalline semiconductor. A crystalline In—Ga—Zn—O based semiconductor in which a c-axis is oriented substantially perpendicular to a layer surface is preferable as the crystalline In—Ga—Zn—O based semiconductor.

Note that a crystal structure of the crystalline In—Ga—Zn—O based semiconductor is disclosed in, for example, JP 2014-007399 A, JP 2012-134475 A, and JP 2014-209727 A as described above. The entire contents of the disclosure of JP 2012-134475 A and JP 2014-209727 A are incorporated herein by reference. A TFT including an In—Ga—Zn—O based semiconductor layer has high mobility (more than 20 times as compared to an a-Si TFT) and a low leakage current (less than $1/100$-th as compared to the a-Si TFT). Thus, such a TFT can be suitably used as a driving TFT (for example, a TFT included in a drive circuit provided in a periphery of a display region including a plurality of pixels, and on the same substrate as the display region) and a pixel TFT (TFT provided in a pixel).

In place of the In—Ga—Zn—O based semiconductor, the oxide semiconductor layer 12 may include another oxide semiconductor. For example, the oxide semiconductor layer may include an In—Sn—Zn—O based semiconductor (for example, $In_2O_3$—$SnO_2$—$ZnO$; InSnZnO). The In—Sn—Zn—O based semiconductor is a ternary oxide of In (indium), Sn (tin), and Zn (zinc). Alternatively, the oxide semiconductor layer 12 may include an In—Al—Zn—O based semiconductor, an In—Al—Sn—Zn—O based semiconductor, a Zn—O based semiconductor, an In—Zn—O based semiconductor, a Zn—Ti—O based semiconductor, a Cd—Ge—O based semiconductor, a Cd—Pb—O based semiconductor, CdO (cadmium oxide), a Mg—Zn—O based semiconductor, an In—Ga—Sn—O based semiconductor, an In—Ga—O based semiconductor, a Zr—In—Zn—O based semiconductor, a Hf—In—Zn—O based semiconductor, an Al—Ga—Zn—O based semiconductor, a Ga—Zn—O based semiconductor, an In—Ga—Zn—Sn—O based semiconductor, and the like.

INDUSTRIAL APPLICABILITY

According to an embodiment of the present disclosure, it is possible to reduce manufacturing processes of an active matrix substrate including an oxide semiconductor TFT having a top gate structure as a pixel TFT and manufacturing processes of an in-cell touch panel having such an active matrix substrate to reduce manufacturing costs.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An active matrix substrate including a plurality of pixel areas arranged in a matrix in a row direction and a column direction, the plurality of pixel areas including a plurality of pixel rows and a plurality of pixel columns, the active matrix substrate comprising:
   a substrate having a main surface;
   a plurality of light blocking layers provided on the main surface of the substrate;
   a lower insulating layer provided to cover the plurality of light blocking layers;
   pixel TFTs, each pixel TFT being provided corresponding to each of the plurality of pixel areas, the pixel TFT including an oxide semiconductor layer provided on the lower insulating layer, a gate insulating layer provided on the oxide semiconductor layer, and a gate electrode provided to face the oxide semiconductor layer with the gate insulating layer interposed between the gate electrode and the oxide semiconductor layer;
   a plurality of gate wiring lines extending in the row direction, each gate wiring line being formed from a conductive film the same as the gate electrode;
   a plurality of source wiring lines extending in the column direction;
   pixel electrodes, each pixel electrode being provided in each of the plurality of pixel areas and electrically connected to the pixel TFT;
   an interlayer insulating layer provided to cover the oxide semiconductor layer, the gate electrode, and the plurality of gate wiring lines;
   a common electrode provided on the interlayer insulating layer and including a plurality of segments, each segment being capable of functioning as a touch sensor electrode; and
   a plurality of touch wiring lines extending in the column direction, each touch wiring line being connected to the corresponding touch sensor electrode,
   wherein the oxide semiconductor layer includes a channel region, a first low-resistive region, and a second low-resistive region, the first low-resistive region and the second low-resistive region being located on both sides of the channel region and having specific resistances lower than the channel region, the first low-resistive region being connected to any one of the plurality of source wiring lines,
   the plurality of source wiring lines and the plurality of touch wiring lines are located between the main surface of the substrate and the lower insulating layer, and are formed from a conductive film the same as the plurality of light blocking layers,
   the pixel electrode is formed from an oxide film the same as the oxide semiconductor film, and is continuous with the second low-resistive region in the oxide semiconductor layer,
   the plurality of gate wiring lines and the plurality of source wiring lines are arranged such that a pair of gate wiring lines are connected to one pixel row and one source wiring line is connected to a pair of pixel columns, the pair of pixel columns including a first pixel column and a second pixel column adjacent to the first pixel column, and when viewed from a normal direction of the main surface of the substrate, each of the plurality of source wiring lines is disposed between the first pixel column and the second pixel column in the corresponding pair of pixel columns, and each of the plurality of touch wiring lines is disposed between two adjacent pixel columns between two adjacent source wiring lines of the plurality of source wiring lines.

2. The active matrix substrate according to claim 1, further comprising:

a connection electrode formed from a transparent conductive film the same as the common electrode, the connection electrode connecting any of the plurality of source wiring lines to the first low-resistive region of the oxide semiconductor layer in the pixel TFT.

3. The active matrix substrate according to claim 2, wherein the connection electrode connects any one of the plurality of source wiring lines to the first low-resistive region of the oxide semiconductor layer within a source contact hole formed in the interlayer insulating layer and the lower insulating layer.

4. The active matrix substrate according to claim 1, wherein the oxide semiconductor layer of the pixel TFT is disposed on the lower insulating layer and within a source contact hole formed in the lower insulating layer, and is connected to any one of the plurality of source wiring lines within the source contact hole.

5. The active matrix substrate according to claim 1, wherein the touch sensor electrode is connected to any one of the plurality of touch wiring lines within a touch contact hole formed in the interlayer insulating layer and the lower insulating layer.

6. The active matrix substrate according to claim 1, wherein the pair of gate wiring lines are adjacent to each other with the one pixel row interposed between the pair of gate wiring lines when viewed from the normal direction of the main surface of the substrate.

7. The active matrix substrate according to claim 6, wherein the pair of pixel columns includes a plurality of pixel sets, each pixel set being constituted by two pixel areas located in different pixel rows, the pixel electrodes and the oxide semiconductor layers in two pixel areas of each of the plurality of pixel sets are formed in one continuous oxide pattern, and the oxide pattern of each of the plurality of pixel sets is separated from an oxide pattern of another pixel set.

8. The active matrix substrate of claim 7, wherein the first low-resistive regions of the oxide semiconductor layers in two pixel areas of each of the plurality of pixel sets are electrically connected to the one source wiring line at one common source contact portion.

9. The active matrix substrate according to claim 1, wherein the plurality of source wiring lines and the plurality of touch wiring lines are arranged alternately in the row direction.

10. The active matrix substrate according to claim 1, further comprising:

at least one dummy touch wiring line located between the main surface of the substrate and the lower insulating layer, and formed from the conductive film the same as the plurality of light blocking layers, wherein the at least one dummy touch wiring line is not electrically connected to any of the touch sensor electrodes, and the plurality of source wiring lines, the plurality of touch wiring lines, and the at least one dummy touch wiring line are arranged alternately in the row direction.

11. The active matrix substrate according to claim 1, wherein the active matrix substrate does not comprise an organic insulating layer between the common electrode and the substrate.

12. The active matrix substrate according to claim 1, wherein the pair of pixel columns includes, per pixel row, a pair of pixels constituted by a first pixel area and a second pixel area adjacent to each other, both of the first low-resistive regions of the pixel TFTs disposed in the first pixel area and the second pixel area are connected to the one source wiring line, and the gate electrode of the pixel TFT disposed in the first pixel area is connected to one of the pair of gate wiring lines, and the gate electrode of the pixel TFT disposed in the second pixel area is connected to the other of the pair of gate wiring lines.

13. The active matrix substrate according to claim 1, wherein the oxide semiconductor layer includes an In—Ga—Zn—O based semiconductor.

14. The active matrix substrate according to claim 13, wherein the In—Ga—Zn—O based semiconductor includes a crystalline portion.

15. An in-cell touch panel liquid crystal display device including a plurality of pixels, the in-cell touch panel liquid crystal display device comprising:

the active matrix substrate according to claim 1;

a counter substrate disposed to face the active matrix substrate; and a liquid crystal layer provided between the active matrix substrate and the counter substrate, wherein the in-cell touch panel liquid crystal display device includes the plurality of pixels corresponding to the plurality of pixel areas in the active matrix substrate, and display is performed by double gate drive in which each pixel row is scanned two times within one vertical scanning period, where some of pixels in each pixel row are selected in the first time scan and the rest of the pixels are selected in the second scan.

16. A manufacturing method of an active matrix substrate, the active matrix substrate being according to claim 1, the manufacturing method comprising:

(a) depositing a first conductive film on the main surface of the substrate, and then, patterning the first conductive film to form the plurality of light blocking layers, the plurality of source wiring lines, and the plurality of touch wiring line;

(b) forming the lower insulating layer to cover the plurality of light blocking layers and the plurality of source wiring lines, and then, depositing an oxide semiconductor film on the lower insulating layer, and then, patterning the oxide semiconductor film;

(c) depositing an insulating film and a second conductive film in this order to cover the oxide semiconductor film, and then, patterning the insulating film and the second conductive film to form the gate insulating layer, the gate electrode, and the plurality of gate wiring lines;

(d) forming the interlayer insulating layer to cover the oxide semiconductor layer, the gate electrode, and the plurality of gate wiring lines;

(e) forming a plurality of touch contact holes in the interlayer insulating layer and the lower insulating layer, each touch contact hole exposing a portion of any one of the plurality of touch wiring lines; and (f) depositing a transparent conductive film on the interlayer insulating layer, and then, patterning the transparent conductive film to form the common electrode including the plurality of segments, each segment functioning as the touch sensor electrode, the touch sensor electrode being connected to any one of the plurality of touch wiring lines within at least one touch contact hole of the plurality of touch contact holes, and the manufacturing method further comprising:

(g) lowering a resistance of a portion of the oxide semiconductor film to obtain the first low-resistive region, the second low-resistive region, and the pixel electrode.

17. The manufacturing method of the active matrix substrate according to claim 16, wherein the (e) forming a plurality of touch contact holes includes forming a plurality of source contact holes with the plurality of touch contact holes in the interlayer insulating layer and the lower insulating layer, each source contact hole exposing a portion of the first low-resistive region of the oxide semiconductor layer and a portion of any one of the plurality of source wiring lines, and the (f) depositing a transparent conductive film includes patterning the transparent conductive film to form a connection electrode with the common electrode, the connection electrode connecting any one of the plurality of source wiring lines to the first low-resistive region within any one of the plurality of source contact holes.

18. The manufacturing method of the active matrix substrate according to claim 16, wherein the (b) forming the lower insulating layer includes patterning the oxide semiconductor film to form a plurality of oxide patterns separated from each other, each of the plurality of oxide patterns being disposed for two pixel areas of the plurality of pixel areas and including a portion corresponding to the pixel electrodes and the oxide semiconductor layers of the two pixel areas.

* * * * *